(12) United States Patent
Mohanan et al.

(10) Patent No.: US 9,486,792 B2
(45) Date of Patent: *Nov. 8, 2016

(54) MIXED METAL 8-RING SMALL PORE MOLECULAR SIEVE CATALYST COMPOSITIONS, CATALYTIC ARTICLES, SYSTEMS, AND METHODS

(71) Applicants: BASF Corporation, Florham Park, NJ (US); N.E. Chemcat Corporation, Tokyo (JP); Heesung Catalysts Corporation, Kyunggi-Do (KR)

(72) Inventors: Jaya L. Mohanan, Edison, NJ (US); Patrick Burk, Freehold, NJ (US); Michael Breen, Erie, PA (US); Barbara Slawski, North Royalton, OH (US); Makoto Nagata, Shizuoka (JP); Yasuyuki Banno, Shizuoka (JP); Eunseok Kim, Kyunggi-Do (KR)

(73) Assignees: BASF Corporation, Florham Park, NJ (US); Heesung Cataysts Corporation, Kyunggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/563,172

(22) Filed: Dec. 8, 2014

(65) Prior Publication Data

US 2015/0086456 A1 Mar. 26, 2015

Related U.S. Application Data

(63) Continuation of application No. 14/055,953, filed on Oct. 17, 2013, now Pat. No. 9,242,238.

(60) Provisional application No. 61/716,073, filed on Oct. 19, 2012.

(51) Int. Cl.
*B01J 29/80* (2006.01)
*B01D 53/94* (2006.01)
(Continued)

(52) U.S. Cl.
CPC ............... *B01J 29/80* (2013.01); *B01D 53/94* (2013.01); *B01D 53/9418* (2013.01); *B01J 29/70* (2013.01);
(Continued)

(58) Field of Classification Search
CPC ............ B01D 2255/2042; B01D 2255/20738; B01D 2255/20761; B01D 2255/50; B01D 53/9418; B01J 29/80; B01J 37/0246; B01J 29/70; B01J 29/763
See application file for complete search history.

(56) References Cited

U.S. PATENT DOCUMENTS

| 3,030,181 A | 4/1962 | Milton et al. |
| 4,440,871 A | 4/1984 | Lok et al. |

(Continued)

FOREIGN PATENT DOCUMENTS

| CN | 104159667 A | * 11/2014 | ......... B01D 53/9418 |
| EP | 2517777 A2 | * 10/2012 | ......... B01D 53/9418 |

(Continued)

OTHER PUBLICATIONS

Non-Final Office Action in U.S. Appl. No. 14/055,953, dated Jun. 16, 2014, 8 pages.
(Continued)

*Primary Examiner* — Timothy Vanoy
(74) *Attorney, Agent, or Firm* — Womble Carlyle Sandridge & Rice LLP

(57) ABSTRACT

Described are compositions and catalytic articles comprising both a copper-promoted 8-ring small pore molecular sieve and an iron-promoted 8-ring small pore molecular sieve. The catalytic articles are useful in methods and systems to catalyze the reduction of nitrogen oxides in the presence of a reductant.

16 Claims, 12 Drawing Sheets

(51) Int. Cl.
*B01J 37/02* (2006.01)
*B01J 29/70* (2006.01)
*B01J 29/76* (2006.01)
*B01J 29/83* (2006.01)
*B01J 29/85* (2006.01)

(52) U.S. Cl.
CPC ............... *B01J 29/763* (2013.01); *B01J 29/83* (2013.01); *B01J 29/85* (2013.01); *B01J 37/0246* (2013.01); *B01D 2255/2042* (2013.01); *B01D 2255/20738* (2013.01); *B01D 2255/20761* (2013.01); *B01D 2255/50* (2013.01)

(56) References Cited

U.S. PATENT DOCUMENTS

| | | | |
|---|---|---|---|
| 4,544,538 | A | 10/1985 | Zones |
| 5,516,497 | A | 5/1996 | Speronello et al. |
| 6,162,415 | A | 12/2000 | Liu et al. |
| 7,264,789 | B1 | 9/2007 | Verduijn et al. |
| 7,601,662 | B2 | 10/2009 | Bull et al. |
| 9,126,180 | B2 * | 9/2015 | Fedeyko ............ B01D 53/9418 |
| 9,242,238 | B2 * | 1/2016 | Mohanan .................. B01J 29/80 |
| 2011/0085942 | A1 | 4/2011 | Ogyu et al. |
| 2012/0184429 | A1 | 7/2012 | Andersen et al. |
| 2012/0189518 | A1 | 7/2012 | Anderson et al. |
| 2013/0272937 | A1 | 10/2013 | Tokunaga et al. |

FOREIGN PATENT DOCUMENTS

| | | | |
|---|---|---|---|
| GB | 868846 | 5/1961 | |
| WO | WO-2008/106519 | 9/2008 | |
| WO | WO-2010/075345 | 7/2010 | |
| WO | WO-2011/064666 | 6/2011 | |
| WO | WO-2012/091046 | 7/2012 | |
| WO | WO 2013114172 A1 * | 8/2013 | ......... B01D 53/9418 |

OTHER PUBLICATIONS

PCT International Search Report and Written Opinion in PCT/US2013/065492, mailed Mar. 14, 2014, 11 pages.

Barrer, R. M., et al., The Hydrothermal Chemistry of the Silicates. Part VII. Synthetic Potassium Aluminosilicates, *J. Chem. Soc.* 1952, 2882-2891.

Blecken, Francesca, et al., The Effect of Acid Strength on the Conversion of Methanol to Olefins Over Acidic Microporous Catalysts with the CHA Topology, *Top Catal.* vol. 52, 2009, 218-228.

Breck, D.W., Zeolite Molecular Sieves, *John Wiley & Sons* 1973, 60 pages.

DIN66131, Bestimmung der spezifischen Oberflache von Feststoffen durch Gasadsorption nach Brunauer, Emmett and Teller (BET), Jul. 1993, 7 pages.

International Preliminary Report on Patentability dated Apr. 21, 2015.

Kröcher et al., Combination of $V_2O_5/WO_3$-$TiO_2$, Fe-ZSM5, and Cu-ZSM5 Catalysts for the Selective Catalytic Reduction of Nitric Oxide with Ammonia, *Ind. Eng. Chem. Res.*, 2008, vol. 47, pp. 8588-8593.

* cited by examiner

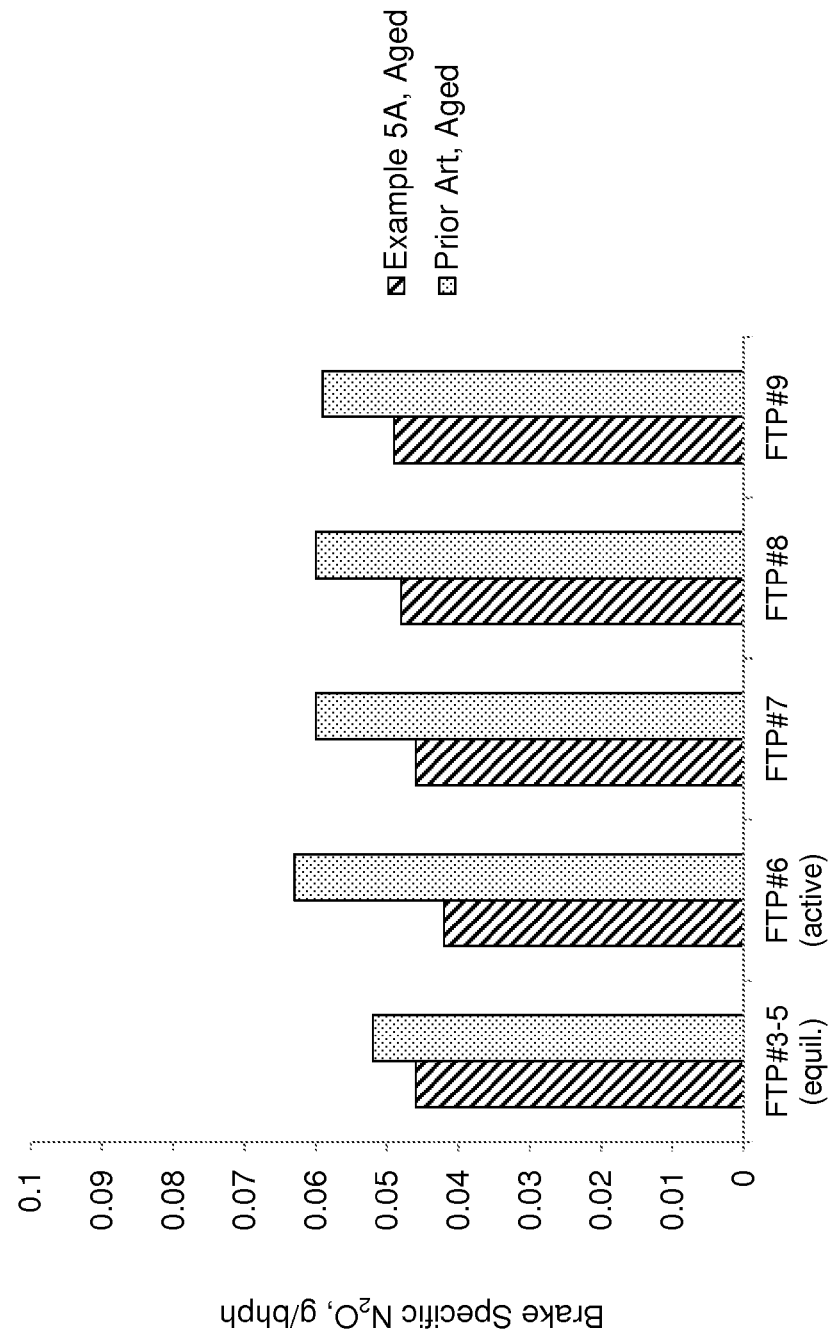

MIXED METAL 8-RING SMALL PORE MOLECULAR SIEVE CATALYST COMPOSITIONS, CATALYTIC ARTICLES, SYSTEMS, AND METHODS

CROSS-REFERENCE TO RELATED APPLICATIONS

This application is a continuation of application Ser. No. 14/055,953, filed Oct. 17, 2013, which claims priority to Provisional Application Ser. No. 61/716,073, filed Oct. 19, 2012, the contents of which are hereby incorporated by reference in their entireties.

TECHNICAL FIELD

The present invention pertains to the field of selective catalytic reduction catalyst materials. More particularly, embodiments of the invention relate to mixed metal molecular sieve catalyst compositions, selective catalytic reduction catalytic articles comprising a washcoat containing 8-ring small pore molecular sieves, and methods of using these catalysts in a variety of processes such as abating pollutants in exhaust gases.

BACKGROUND

Molecular sieves such as zeolites have been used extensively to catalyze a number of chemical reactions in refinery and petrochemical reactions, and catalysis, adsorption, separation, and chromatography. For example, with respect to zeolites, both synthetic and natural zeolites and their use in promoting certain reactions, including conversion of methanol to olefins (MTO reactions) and the selective catalytic reduction (SCR) of nitrogen oxides with a reductant such as ammonia, urea or a hydrocarbon in the presence of oxygen, are well known in the art. Zeolites are crystalline materials having rather uniform pore sizes which, depending upon the type of zeolite and the type and amount of cations included in the zeolite lattice, range from about 3 to 10 Angstroms in diameter. Zeolites having 8-ring pore openings and double-six ring secondary building units, particularly those having cage-like structures have recently found interest in use as SCR catalysts. A specific type of zeolite having these properties is chabazite (CHA), which is a small pore zeolite with 8 member-ring pore openings (~3.8 Angstroms) accessible through its 3-dimensional porosity. A cage like structure results from the connection of double six-ring building units by 4 rings.

Catalysts employed in the SCR process ideally should be able to retain good catalytic activity over the wide range of temperature conditions of use, for example, 200° C. to 600° C. or higher, under hydrothermal conditions. Hydrothermal conditions are often encountered in practice, such as during the regeneration of a soot filter, a component of the exhaust gas treatment system used for the removal of particles.

Metal-promoted zeolite catalysts including, among others, iron-promoted and copper-promoted zeolite catalysts, for the selective catalytic reduction of nitrogen oxides with ammonia are known. Iron-promoted zeolite beta has been an effective commercial catalyst for the selective reduction of nitrogen oxides with ammonia. Unfortunately, it has been found that under harsh hydrothermal conditions, for example, exhibited during the regeneration of a soot filter with temperatures locally exceeding 700° C., the activity of many metal-promoted zeolites begins to decline. This decline is often attributed to dealumination of the zeolite and the consequent loss of metal-containing active centers within the zeolite.

The synthesis of a zeolite varies according to structure type of the zeolite, but usually, zeolites are synthesized using a structure directing agent, sometimes referred to as a template or organic template, together with sources of silica and alumina. The structure directing agent can be in the form of an organic, i.e. tetraethylammonium hydroxide (TEAOH), or inorganic cation, i.e. $Na^+$ or $K^+$. During crystallization, the tetrahedral silica-alumina units organize around the SDA to form the desired framework, and the SDA is often embedded within the pore structure of the zeolite crystals.

Metal-promoted, particularly copper-promoted aluminosilicate zeolites having the CHA structure type and a silica to alumina molar ratio greater than 1, particularly those having a silica to alumina ratio greater than or equal to 5, 10, or 15 and less than about 1000, 500, 250, 100 and 50 have recently solicited a high degree of interest as catalysts for the SCR of oxides of nitrogen in lean burning engines using nitrogenous reductants. This is because of the wide temperature window coupled with the excellent hydrothermal durability of these materials, as described in U.S. Pat. No. 7,601,662. Prior to the discovery of metal promoted zeolites described in U.S. Pat. No. 7,601,662, while the literature had indicated that a large number of metal-promoted zeolites had been proposed in the patent and scientific literature for use as SCR catalysts, each of the proposed materials suffered from one or both of the following defects: (1) poor conversion of oxides of nitrogen at low temperatures, for example 350° C. and lower; and (2) poor hydrothermal stability marked by a significant decline in catalytic activity in the conversion of oxides of nitrogen by SCR. Thus, the invention described in U.S. Pat. No. 7,601,662 addressed a compelling, unsolved need to provide a material that would provide conversion of oxides of nitrogen at low temperatures and retention of SCR catalytic activity after hydrothermal aging at temperatures in excess of 650° C.

Thus, one of the challenges of meeting current governmental (for example, Euro 6) $NO_x$ regulations is the improvement of low temperature performance of the existing Cu-SSZ13 based SCR catalysts. Additionally, light duty diesel (LDD) applications now require fast transient $NO_x$ conversion response at low $NH_3$ storage levels. While current SCR technology has the maximum $NO_x$ conversion at its highest $NH_3$ storage capacity, light duty diesel customers demand the same maximum $NO_x$ conversion from 0.5 g/L to 1 g/L $NH_3$ storage levels. Accordingly, an SCR catalyst is needed that shows optimal performance at significantly lower $NH_3$ filling level versus Cu-SSZ13.

SUMMARY

A first aspect of the present invention is directed to a selective catalytic reduction composition comprising a copper-promoted 8-ring small pore molecular sieve and an iron-promoted 8-ring small pore molecular sieve, the composition effective to catalyze the reduction of nitrogen oxides in the presence of a reductant. In a specific embodiment, the composition is in the form a catalytic article, including a washcoat containing the copper-promoted 8-ring small pore molecular sieve and an iron-promoted 8-ring small pore molecular sieve In one or more embodiments, the copper-promoted 8-ring small pore molecular sieve is selected from the group consisting of copper-promoted zeolite having a structure type selected from AEI, AFT, AFX, CHA, EAB, ERI, KFI, LEV, SAS, SAT, and SAV. In a specific embodiment, the copper-promoted 8-ring small pore molecular sieve has the CHA crystal structure.

In one or more embodiments, the copper-promoted 8-ring small pore molecular sieve has the CHA crystal structure and is selected from an aluminosilicate zeolite, a borosilicate, a gallosilicate, a SAPO, an AlPO, a MeAPSO, and a MeAPO.

In one or more embodiments, the copper-promoted 8-ring small pore molecular sieve is selected from the group consisting of copper-promoted SSZ-13, SSZ-62, natural chabazite, zeolite K-G, Linde D, Linde R, LZ-218, LZ-235, LZ-236, ZK-14, SAPO-34, SAPO-44, SAPO-47, and ZYT-6.

In one or more embodiments, the iron-promoted 8-ring small pore molecular sieve has the CHA crystal structure and is selected from the group of aluminosilicate zeolite, a borosilicate, a gallosilicate, a SAPO, an AlPO, a MeAPSO, MeAPO. In a specific embodiment, the iron-promoted 8-ring small pore molecular sieve having the CHA structure is an iron-promoted aluminosilicate zeolite having the CHA crystal structure.

In one or more embodiments, the 8-ring small pore molecular having the CHA structure is an aluminosilicate zeolite having the CHA structure. In a specific embodiment, the aluminosilicate zeolite having the CHA crystal structure is selected from SSZ-13 and SSZ-62.

In one or more embodiments, the copper-promoted 8-ring small pore molecular sieve comprises a barium component. In one or more embodiments, the catalytic article comprises the copper-promoted 8-ring small pore molecular sieve and the iron-promoted 8-ring small pore molecular sieve are contained in a single washcoat disposed on a substrate.

In one or more embodiments, the copper-promoted 8-ring small pore molecular sieve and the iron-promoted 8-ring small pore molecular sieve each are selected from SSZ-13 and SSZ-62 and are present in a ratio in the range of 1:1 to 10:1 by weight of the copper-promoted 8-ring molecular sieve to the iron-promoted 8-ring small pore molecular sieve. In specific embodiments, the range of the copper-promoted 8 ring small pore molecular sieve to the iron-promoted small more molecular sieve is 1:1, 2:1, 3:1, 4:1, 5:1; 6:1; 7:1; 8:1; 9:1 or 10:1 by weight. In one or more embodiments, the copper-promoted 8-ring small pore molecular sieve comprises a barium component.

In one or more embodiments, the article is effective to catalyze the selective catalytic reduction of nitrogen oxides in the presence of a reductant at temperatures between 200° C. to 600° C.

In one or more embodiments, the silica to alumina ratio of aluminosilicate zeolites is in the range of 10 and 100.

Further embodiments of the invention pertain to a method for selectively reducing nitrogen oxides (NOx), the method comprising contacting an exhaust gas stream containing NOx with a catalyst composition comprising a first 8-ring small pore molecular sieve promoted with copper and a second 8-ring small pore molecular sieve promoted with iron. The method may include any of the above-described variants of the catalytic article.

Still a further aspect of the invention pertain to systems for the treatment of exhaust gas from a lean burn engine containing NOx comprising the catalytic articles described above and at least one other exhaust gas treatment component.

BRIEF DESCRIPTION OF THE DRAWINGS

FIG. 12 is a bar chart showing engine data, brake specific $N_2O$ make, of FTP cycles #3-9 (equilibrium, active, and recovery cycles) with 0.5 $NO_2$/NOx with no soaks for aged samples of Example 5A and fresh prior art SCR2.

DETAILED DESCRIPTION

Figure 1:
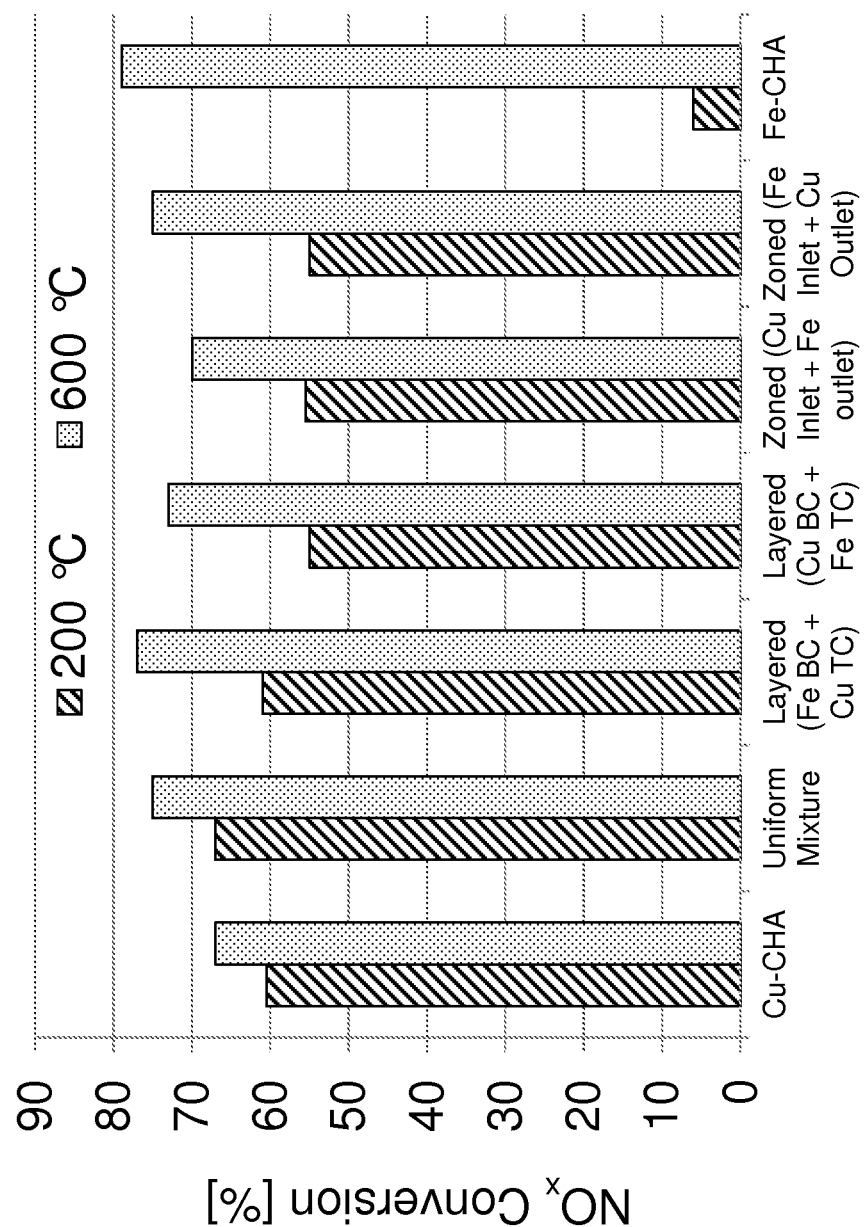
FIG. 1 is a bar chart showing lab reactor NOx conversion of various samples, including Cu-CHA and various types of mixtures and zoning of Cu-CHA and Fe-CHA samples.

Before describing several exemplary embodiments of the invention, it is to be understood that the invention is not limited to the details of construction or process steps set forth in the following description. The invention is capable of other embodiments and of being practiced or being carried out in various ways.

Governmental regulations mandate the use of $NO_x$ reduction technologies for light and heavy-duty vehicles. Selective catalytic reduction (SCR) of $NO_x$ using urea is an effective and dominant emission control technology for $NO_x$ control. To meet governmental regulations, an SCR catalyst that has improved low and high temperature performance compared to the current Cu-SSZ-13 based benchmark technology is necessary. Provided is an SCR catalyst having $NO_x$ conversion efficiency improvement at low $NH_3$ storage levels.

Embodiments of the invention are directed to molecular sieves, methods for their preparation, catalytic articles including molecular sieves, exhaust gas systems, and methods of abating pollutants from exhaust gases using such molecular sieves.

With respect to the terms used in this disclosure, the following definitions are provided.

As used herein, molecular sieves refer to materials based on an extensive three-dimensional network of oxygen ions containing generally tetrahedral type sites and having a pore distribution. A zeolite is a specific example of a molecular sieve, further including silicon and aluminum. Reference to a "non-zeolite-support" or "non-zeolitic support" in a catalyst layer refers to a material that is not a molecular sieve or zeolite and that receives precious metals, stabilizers, promoters, binders, and the like through association, dispersion, impregnation, or other suitable methods. Examples of such non-zeolitic supports include, but are not limited to, high surface area refractory metal oxides. High surface area refractory metal oxide supports can comprise an activated compound selected from the group consisting of alumina, zirconia, silica, titania, silica-alumina, zirconia-alumina, titania-alumina, lanthana-alumina, lanthana-zirconia-alumina, baria-alumina, baria-lanthana-alumina, baria-lanthana-neodymia-alumina, zirconia-silica, titania-silica, and zirconia-titania.

As used herein, the term "catalyst" refers to a material that promotes a reaction. As used herein, the phrase "catalyst composition" refers to a combination of two or more catalysts, or example a combination of an iron-promoted molecular sieve and a copper-promoted molecular sieve. The catalyst composition may be in the form of a washcoat in which the two molecular sieves are mixed together.

As used herein, the term "carrier" refers to a support that carries or supports a catalytic species. For example, refractory metal oxide particles may be a carrier for platinum group metal catalytic species.

As used herein, the term "substrate" refers to the monolithic material onto which the carrier is placed, typically in the form of a washcoat containing a plurality of carriers having catalytic species thereon. A washcoat is formed by preparing a slurry containing a specified solids content (e.g., 30-90% by weight) of carriers in a liquid vehicle, which is then coated onto a substrate and dried to provide a washcoat layer.

As used herein, the term "washcoat" has its usual meaning in the art of a thin, adherent coating of a catalytic or other material applied to a substrate carrier material, such as a honeycomb-type carrier member, which is sufficiently porous to permit the passage of the gas stream being treated.

"Catalytic article" refers to an element that is used to promote a desired reaction. For example, a catalytic article may comprise a washcoat containing catalytic species on a substrate.

In one or more embodiments, the substrate is a ceramic or metal having a honeycomb structure. Any suitable substrate may be employed, such as a monolithic substrate of the type having fine, parallel gas flow passages extending therethrough from an inlet or an outlet face of the substrate such that passages are open to fluid flow there through. The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e. cells) per square inch of cross section.

The ceramic substrate may be made of any suitable refractory material, e.g. cordierite, cordierite-α-alumina, silicon nitride, zircon mullite, spodumene, alumina-silica-magnesia, zircon silicate, sillimanite, a magnesium silicate, zircon, petalite, α-alumina, an aluminosilicate and the like.

The substrates useful for the catalyst carriers of embodiments of the present invention may also be metallic in nature and be composed of one or more metals or metal alloys. The metallic substrates may be employed in various shapes such as pellets, corrugated sheet or monolithic form. Specific examples of metallic substrates include the heat-resistant, base-metal alloys, especially those in which iron is a substantial or major component. Such alloys may contain one or more of nickel, chromium, and aluminum, and the total of these metals may advantageously comprise at least about 15 wt. % of the alloy, for instance, about 10 to 25 wt. % chromium, about 1 to 8 wt. % of aluminum, and about 0 to 20 wt. % of nickel.

One or more embodiments are directed to catalyst compositions comprising an iron-promoted 8-ring small pore molecular sieve and a copper-promoted 8-ring small pore molecular sieve. In specific embodiments, the catalyst composition is in the form of a washcoat which provides a catalytic article. In one embodiment, a catalytic article comprises a washcoat containing both a copper-promoted 8-ring small pore molecular sieve and an iron-promoted 8-ring small pore molecular sieve. In specific embodiments the washcoat ison a substrate.

"Rich gaseous streams" including rich exhaust streams mean gas streams that have a $\lambda<1.0$.

"Rich periods" refer to periods of exhaust treatment where the exhaust gas composition is rich, i.e., has a $\lambda<1.0$.

"Rare earth metal components" refer to one or more oxides of the lanthanum series defined in the Periodic Table of Elements, including lanthanum, cerium, praseodymium and neodymium. Rare earth metal components can include at least one rare earth metal selected from Ce, Pr, Nd, Eu, Nb, Sm, Yb, and La.

"Alkaline earth component" refers to one or more chemical elements defined in the Periodic Table of Elements, including beryllium (Be), magnesium (Mg), calcium (Ca), strontium (Sr), barium (Ba), and radium (Ra).

"Alkali metal component" refers to one or more chemical elements defined in the Periodic Table of Elements, including lithium (Li), sodium (Na), potassium (K), rubidium (Rb), cesium (Cs), and francium (Fr).

The catalytic articles are effective to catalyze the reduction of nitrogen oxides in the presence of a reductant. The molecular sieves have 8-ring pore openings and double-six ring secondary building units, for example, those having the following structure types: AEI, AFT, AFX, CHA, EAB, ERI, KFI, LEV, SAS, SAT, and SAV. According to one or more embodiments, it will be appreciated that by defining the molecular sieves by their structure type, it is intended to include the structure type and any and all isotypic framework materials such as SAPO, AlPO and MeAPO materials having the same structure type.

In more specific, embodiments, reference to an aluminosilicate zeolite structure type limits the material to molecular sieves that do not include phosphorus or other metals substituted in the framework. Of course, aluminosilicate zeolites may be subsequently ion-exchanged with one or more promoter metals such as iron, copper, cobalt, nickel, cerium or platinum group metals. However, to be clear, as used herein, "aluminosilicate zeolite" excludes aluminophosphate materials such as SAPO, AlPO, and MeAPO materials, and the broader term "zeolite" is intended to include aluminosilicates and aluminophosphates.

Three different catalytic article designs were prepared using Cu-SSZ-13 and Fe-SSZ-13. The designs included layered, zoned, and a uniform mixture in a 2:1 ratio of Cu-SSZ-13:Fe-SSZ-13. The uniform mixture catalytic article showed the highest performance at 200° C. and 600° C.

In general, the SCR catalytic article based on a copper-promoted 8-ring small pore molecular sieve and an iron-promoted 8-ring small pore molecular sieve should exhibit equivalent or better $NO_x$ conversion activity with Cu-SSZ13 catalytic articles. In general, the catalytic article should exhibit both good low temperature $NO_x$ conversion activity ($NO_x$ conversion>50% at 200° C.) and good high temperature $NO_x$ conversion activity ($NO_x$ conversion>70% at 450° C.). The $NO_x$ activity is measured under steady state conditions at maximum $NH_3$-slip conditions in a gas mixture of 500 ppm NO, 500 ppm $NH_3$, 10% $O_2$, 5% $H_2O$, balance $N_2$ at a volume-based space velocity of 80,000 $h^{-1}$.

In one or more embodiments, the catalytic article is a uniform mixture of a copper-promoted 8-ring small pore molecular sieve and an iron-promoted 8-ring small pore molecular sieve having the CHA crystal structure. In specific embodiments, the copper-promoted 8-ring small pore molecular sieve and the iron-promoted 8-ring small pore molecular sieve having the CHA crystal structure are present in a ratio of in the range of 1:1 to 10:1 by weight of copper promoted to iron promoted molecular sieve, including ratios of 1:1; 2:1; 3:1; 4:1; 5:1; 6:1; 7:1; 8:1; 9:1 and 10:1 of the copper promoted 8-ring small pore molecular sieve material to the iron-promoted 8-ring small pore molecular sieve material.

As used herein, the term "$Na^+$-form of chabazite" refers to the calcined form of this zeolite without any ion exchange. In this form, the zeolite generally contains a mixture of $Na^+$ and $H^+$ cations in the exchange sites. The fraction of sites occupied by $Na^+$ cations varies depending on the specific zeolite batch and recipe.

A molecular sieve can be zeolitic-zeolites—or non-zeolitic, and zeolitic and non-zeolitic molecular sieves can have the chabazite crystal structure, which is also referred to as the CHA structure by the International Zeolite Association. Zeolitic chabazite include a naturally occurring tectosilicate mineral of a zeolite group with approximate formula: $(Ca,Na_2,K_2,Mg)Al_2Si_4O_{12}\cdot 6H_2O$ (e.g., hydrated calcium aluminum silicate). Three synthetic forms of zeolitic chabazite are described in "Zeolite Molecular Sieves," by D. W. Breck, published in 1973 by John Wiley & Sons, which is hereby incorporated by reference. The three synthetic forms reported by Breck are Zeolite K-G, described in J. Chem. Soc., p. 2822 (1956), Barrer et al; Zeolite D, described in British Patent No. 868,846 (1961); and Zeolite R, described in U.S. Pat. No. 3,030,181, which are hereby incorporated by reference. Synthesis of another synthetic form of zeolitic chabazite, SSZ-13, is described in U.S. Pat. No. 4,544,538, which is hereby incorporated by reference. Synthesis of a synthetic form of a non-zeolitic molecular sieve having the chabazite crystal structure, silicoaluminophosphate-34 (SAPO-34), is described in U.S. Pat. No. 4,440,871 and U.S. Pat. No. 7,264,789, which are hereby incorporated by reference. A method of making yet another synthetic non-zeolitic molecular sieve having chabazite structure, SAPO-44, is described in U.S. Pat. No. 6,162,415, which is hereby incorporated by reference.

In one or more embodiments, the copper-promoted 8-ring small pore molecular sieve is selected from the group consisting of AEI, AFT, AFX, CHA, EAB, ERI, KFI, LEV, SAS, SAT, and SAV. In a more specific embodiment, the copper-promoted 8-ring small pore molecular sieve can include all aluminosilicate, borosilicate, gallosilicate, MeAPSO, and MeAPO compositions. These include, but are not limited to SSZ-13, SSZ-62, natural chabazite, zeolite K-G, Linde D, Linde R, LZ-218, LZ-235. LZ-236, ZK-14, SAPO-34, SAPO-44, SAPO-47, ZYT-6, CuSAPO-34, CuSAPO-44, and CuSAPO-47. However, in specific embodiments, the 8-ring small pore molecular sieve will have the aluminosilicate composition, such as SSZ-13 and SSZ-62, which would exclude borosilicate, gallosilicate, MeAPSO, SAPO and MeAPO compositions.

In one or more embodiments, the iron-promoted 8-ring small pore molecular sieve has the CHA crystal structure and is selected from the group is consisting of aluminosilicate zeolite having the CHA crystal structure, SAPO, AlPO, and MeAPO. In particular, the 8-ring small pore molecular sieve having the CHA crystal structure is an aluminosilicate zeolite having the CHA crystal structure. In a specific embodiment, the 8-ring small pore molecular sieve having the CHA crystal structure will have an aluminosilicate composition, such as SSZ-13 and SSZ-62.

Wt % Iron:

The Fe content of the 8-ring small pore molecular sieve promoted with iron, calculated as $Fe_2O_3$, in specific embodiments is at least about 1.5 wt.-%, even more specifically at least about 2 wt.-% and in even more specific embodiments at least about 2.5 wt.-%, reported on a volatile-free basis. In even more specific embodiments, the Fe content of the 8-ring small pore molecular sieve promoted with copper, calculated as CuO, is in the range of up to about 10 wt.-%, more specifically of up to about 9 wt.-%, 8 wt.-%, 7 wt.-%, 6 wt.-%, 5 wt.-%, 4 wt.-% and even more specifically of up to about 3 wt.-%, in each case based on the total weight of the calcined molecular sieve with the CHA structure reported on a volatile free basis. Therefore, in specific embodiments, ranges of the 8-ring small pore molecular sieve promoted with copper, calculated as $Fe_2O_3$, are from about 1 to about 10 wt.-%, more specifically from about 3 to about 10 wt.-%, and even more specifically from about 5 to about 10 wt.-%, and even more specifically from about 6 to about 10 wt.-%, in each case reported on a volatile-free basis.

Wt % Copper:

The Cu content of the 8-ring small pore molecular sieve promoted with copper, calculated as CuO, in specific embodiments is at least about 1.5 wt.-%, even more specifically at least about 2 wt.-% and in even more specific embodiments at least about 2.5 wt.-%, reported on a volatile-free basis. In even more specific embodiments, the Cu content of the 8-ring small pore molecular sieve promoted with copper, calculated as CuO, is in the range of up to about 5 wt.-%, more specifically of up to about 4 wt.-%, and even more specifically of up to about 3.5 wt.-%, in each case based on the total weight of the calcined molecular sieve with the CHA structure reported on a volatile free basis. Therefore, in specific embodiments, ranges of the 8-ring small pore molecular sieve promoted with copper, calculated as CuO, are from about 2 to about 5 wt.-%, more specifically from about 2 to about 4 wt.-%, and even more specifically from about 2.5 to about 3.5 wt.-%, and even more specifically from about 2.75 to about 3.5 wt.-%, in each case reported on a volatile-free basis.

Additionally, the copper-promoted 8-ring small pore molecular sieve can comprise an alkaline earth or alkali metal component. In one or more embodiments, the alkaline earth or alkali earth component is selected from barium, magnesium, beryllium, calcium, strontium, radium, and combinations thereof. In a specific embodiment, the alkaline earth or alkali metal component is selected from barium, magnesium, calcium, and combinations thereof. In a more specific embodiment, the alkaline earth or alkali metal component is barium.

In one or more embodiments, the alkaline earth or alkali metal component loading is less than 5% by weight. In a specific embodiment, the alkaline earth or alkali metal component loading is less than 2.5% by weight. In a more specific embodiment, the alkaline earth or alkali metal component loading is less than 0.5% by weight. In a very specific embodiment, the copper-promoted 8-ring small pore molecular sieve comprises barium that is loaded in an amount of 0.5% by weight.

In one or more embodiments, the copper is exchanged into an 8-ring small pore molecular sieve. In one or more embodiments, the iron is exchanged into a separate 8-ring small pore molecular sieve. The copper-exchanged molecular sieve and iron-exchanged molecular sieve can be the same type of molecular sieve, for example, Cu-SSZ-13 and Fe-SSZ-13 may be placed into a single washcoat by mixing slurries of Cu-SSZ-13 and Fe-SSZ-13 obtained from separate exchange processes. In other embodiments, the Cu-exchanged molecular sieve and the Fe-exchanged molecular sieve may be different. By "different", the molecular sieve may have different properties such as silica to alumina mole ratio or other properties such as crystallite size. For example, a composition in accordance with embodiments of the invention may comprise Cu-SSZ-13 and Fe-SAPO-34 in a single washcoat, or Fe-SSZ-13 and Cu-SAPO-34 in a single washcoat.

In specific embodiments, the 8-ring small pore molecular sieve promoted with copper and the 8-ring small pore molecular sieve promoted with iron have a mole ratio of silica to alumina greater than about 15, even more specifically greater than about 20. In specific embodiments, the 8-ring small pore molecular sieve promoted with copper and the 8-ring small pore molecular sieve promoted with iron has a mole ratio of silica to alumina in the range from about 20 to about 256, more specifically in the range from about 25 to about 40.

In specific embodiments, the atomic ratio of copper to aluminum exceeds about 0.25. In more specific embodiments, the ratio of copper to aluminum is from about 0.25 to about 1, even more specifically from about 0.25 to about 0.5. In even more specific embodiments, the ratio of copper to aluminum is from about 0.3 to about 0.4.

SCR Activity:

In specific embodiments, the catalyst compositions and catalytic articles exhibit an aged $NO_x$ conversion at 200° C. of at least 50% measured at a gas hourly space velocity of 80000 $h^{-1}$. In specific embodiments the catalyst compositions and catalytic articles exhibit an aged $NO_x$ conversion at 450° C. of at least 70% measured at a gas hourly space velocity of 80000 $h^{-1}$. More specifically the aged $NO_x$ conversion at 200° C. is at least 55% and at 450° C. at least 75%, even more specifically the aged $NO_x$ conversion at 200° C. is at least 60% and at 450° C. at least 80%, measured at a gas hourly volume-based space velocity of 80000 $h^{-1}$ under steady state conditions at maximum $NH_3$-slip conditions in a gas mixture of 500 ppm NO, 500 ppm $NH_3$, 10% $O_2$, 5% $H_2O$, balance $N_2$. The cores were hydrothermally aged in a tube furnace in a gas flow containing 10% $H_2O$, 10% $O_2$, balance $N_2$ at a space velocity of 4,000 $h^{-1}$ for 6 h at 850° C. The SCR activity measurement has been demonstrated in the literature, for example WO 2008/106519.

Sodium Content:

In specific embodiments, the 8-ring small pore molecular sieve promoted with copper and the 8-ring small pore molecular sieve promoted with iron each have a sodium content (reported as $Na_2O$ on a volatile free basis) of below 2 wt.-%, based on the total weight of the calcined molecular sieve. In more specific embodiments, sodium content is below 1 wt.-%, even more specifically below 2500 ppm.

Na:Al:

In specific embodiments, the 8-ring small pore molecular sieve promoted with copper and the 8-ring small pore molecular sieve promoted with iron each have atomic sodium to aluminum ratio of less than 0.7. In more specific embodiments, the atomic sodium to aluminum ratio is less than 0.35, even more specifically less than 0.007, even more specifically less than 0.03 and even more specifically less than 0.02.

Na:Cu:

In specific embodiments, the 8-ring small pore molecular sieve promoted with copper and the 8-ring small pore molecular sieve promoted with iron each have an atomic copper to sodium ratio of greater than 0.5. In more specific embodiments, the atomic copper to sodium ratio of greater than 1, even more specifically greater than 10, even more specifically greater than 50.

Conventional Zeolite Synthesis of CHA-Type Zeolites

In what may be referred to as a conventional synthesis of an 8-ring small pore molecular sieve (for example having the CHA structure), a source of silica, a source of alumina, and a structure directing agent are mixed under alkaline aqueous conditions. Typical silica sources include various types of fumed silica, precipitated silica, and colloidal silica, as well as silicon alkoxides. Typical alumina sources include boehmites, pseudo-boehmites, aluminum hydroxides, aluminum salts such as aluminum sulfate or sodium aluminate, and aluminum alkoxides. Sodium hydroxide is typically added to the reaction mixture. A typical structure directing agent for this synthesis is adamantyltrimethyl ammonium hydroxide, although other amines and/or quaternary ammonium salts may be substituted or added to the latter directing agent. The reaction mixture is heated in a pressure vessel with stirring to yield the crystalline SSZ-13 product. Typical reaction temperatures are in the range of 100 and 200° C., and in specific embodiments between 135 and 170° C. Typical reaction times are between 1 hr and 30 days, and in specific embodiments, between 10 hours and 3 days.

At the conclusion of the reaction, optionally the pH is adjusted to between 6 and 10, and in specific embodiments, between 7 and 7.5, and the product is filtered and washed with water. Any acid can be used for pH adjustment, and in specific embodiments nitric acid is used. Alternatively, the product may be centrifuged. Organic additives may be used to help with the handling and isolation of the solid product. Spray-drying is an optional step in the processing of the product. The solid product is thermally treated in air or nitrogen. Alternatively, each gas treatment can be applied in various sequences, or mixtures of gases can be applied. Typical calcination temperatures are in the 400° C. to 850° C. range.

Optionally $NH_4$-Exchange to Form $NH_4$-Chabazite:

Optionally, the obtained alkali metal molecular sieve is $NH_4$-exchanged to form $NH_4$-Chabazite. The $NH_4$-ion exchange can be carried out according to various techniques known in the art, for example Bleken, F.; Bjorgen, M.; Palumbo, L.; Bordiga, S.; Svelle, S.; Lillerud, K.-P.; and Olsbye, U. Topics in Catalysis 52, (2009), 218-228.

Synthesis of CHA-Type Zeolites According to Embodiments of the Invention

According to one or more embodiments, methods for the synthesis of selective catalytic reduction catalytic articles comprising a washcoat containing a copper-promoted 8-ring small pore molecular sieve and an iron-promoted 8-ring small pore molecular sieve are provided. In specific embodiments, the catalytic article comprises a washcoat containing copper-promoted SSZ-13 and iron-promoted SAPO. In other embodiments, both the copper-promoted 8-ring small pore molecular sieve and the iron-promoted 8-ring small pore molecular sieve are selected from SSZ-13 and/or SSZ-62. The synthesis of copper-promoted CHA-type zeolites and iron-promoted CHA-type zeolites, particularly CHA-type aluminosilicate zeolites such as SSZ-13 and SSZ-62 are provided.

Generally, barium can be incorporated into a copper-promoted 8-ring small pore molecular sieve (e.g. Cu-CHA) by crushing, then calcining the direct exchanged Cu-CHA filter cake at 600° C. for 4 hours. A slurry is prepared to 45% target solids, followed by the addition of 2.5% ZrOAc binder based on zeolite solids. The slurry is milled to $D_{90}$% of 7-10 microns. A solution of $Ba(OAc)_2$ (30 mL) is added dropwise to the aqueous slurry of the copper-promoted 8-ring small pore molecular sieve. The pH is adjusted to 4.5 using 15% ammonium hydroxide solution.

Generally, iron is incorporated into the molecular sieve through an Fe-ion exchange at 60° C. for 2 hours at pH 4. The mixture is then washed with deionized water, filtered, and vacuum/air dried. A slurry is prepared of Fe-CHA to 45% target solids, and 5% ZrOAc binder is added based on the zeolite solids. The slurry is mixed well and then milled to $D_{90}$% of 7-10 microns.

The Fe-CHA slurry is then added to the Ba—Cu-CHA slurry in a ratio of 2:1 Cu-CHA:Fe-CHA. The slurries are mixed well, and the pH is adjusted to 4.5 with 15% ammonium hydroxide solution. The mixture is then coated onto to substrates to a washcoat loading of 3 g/in³. The washcoat is dried under air at 130° C. for 5 min. A second coat is then applied. After the final coating, the substrate is calcined at 450° C. for 1 hour.

Bet:

In specific embodiments, the 8-ring small pore molecular sieve promoted with copper and the 8-ring small pore molecular sieve promoted with iron exhibits a BET surface area, determined according to DIN 66131, of at least about 400 m²/g, more specifically of at least about 550 m²/g, even more specifically of at about 650 m²/g. In specific embodiments, the 8-ring small pore molecular sieve promoted with copper and the 8-ring small pore molecular sieve promoted with iron exhibit a BET surface area in the range from about 400 to about 750 m²/g, more specifically from about 500 to about 750 m²/g.

In specific embodiments, the crystallites of the calcined the 8-ring small pore molecular sieve promoted with copper and the 8-ring small pore molecular sieve promoted with iron have a mean length in the range of from 10 nanometers to 100 micrometers, specifically in the range of from 50 nanometers to 5 micrometers, more specifically in the range of 50 nanometers to 500 nanometers as determined via SEM. In more specific embodiments, the molecular sieve crystallites have a mean length greater than 0.5 microns or 1 micron, and less than 5 microns.

Shape:

The compositions according to embodiments of the invention may be provided in the form of a powder or a sprayed material obtained from above-described separation techniques, e.g. decantation, filtration, centrifugation, or spraying. In general, the powder or sprayed material can be shaped without any other compounds, e.g. by suitable compacting, to obtain moldings of a desired geometry, e.g. tablets, cylinders, spheres, or the like. By way of example, the powder or sprayed material is admixed with or coated by suitable modifiers well known in the art. By way of example, modifiers such as silica, alumina, zeolites or refractory binders (for example a zirconium precursor) may be used. The powder or the sprayed material, optionally after admixing or coating by suitable modifiers, may be formed into a slurry, for example with water, which is deposited upon a suitable refractory carrier (for example WO 2008/106519).

The compositions containing 8-ring small pore molecular sieve promoted with copper and the 8-ring small pore molecular sieve promoted with iron according to embodiments of the invention may also be provided in the form of extrudates, pellets, tablets or particles of any other suitable shape, for use as a packed bed of particulate catalyst, or as shaped pieces such as plates, saddles, tubes, or the like.

In specific embodiments, the molecular sieves are substantially comprised of alumina and silica and have a silica to alumina ratio in the range of about 1 to 1000, and in specific embodiments from 1 to 500, and in more specific embodiments from 5 to 300, 5 to 200, 5 to 100, 10 to 90, 10 to 80, 10 to 70, 10 to 60, 10 to 50, 10 to 40, 10 to 35 and 10 to 30 are within the scope of the invention. In specific embodiments, the molecular sieves are copper-promoted SSZ-13 and/or copper-promoted SSZ-62, and iron-promoted SAPO.

Moreover, embodiments of the invention relates to a method of catalyzing a chemical reaction wherein the composition containing an 8-ring small pore molecular sieve promoted with copper and an 8-ring small pore molecular sieve promoted with iron according to embodiments of the invention is employed as catalytically active material. As discussed above, the composition is used to provide a catalytic article, for example, a washcoat disposed on substrate such as a honeycomb substrate.

Among others, said compositions and catalytic articles may be employed to catalyze the selective reduction (SCR) of nitrogen oxides ($NO_x$); for the oxidation of $NH_3$, in particular for the oxidation of $NH_3$ slip in diesel systems; for the decomposition of $N_2O$; for soot oxidation; for emission control in Advanced Emission Systems such as Homogeneous Charge Compression Ignition (HCCI) engines; as additive in fluid catalytic cracking (FCC) processes; to catalyze organic conversion reactions; or in "stationary source" processes. For applications in oxidation reactions, in specific embodiments an additional precious metal component is added to the copper chabazite (e.g. Pd, Pt).

Therefore, embodiments of the invention also relate to a method for selectively reducing nitrogen oxides ($NO_x$) by contacting a stream containing $NO_x$ with a composition or catalytic article containing the 8-ring small pore molecular sieve promoted with copper and the 8-ring small pore molecular sieve promoted with iron according to embodiments of the invention under suitable reducing conditions; to a method of oxidizing $NH_3$, in particular of oxidizing $NH_3$ slip in diesel systems, by contacting a stream containing $NH_3$ with a composition or catalytic article comprising an 8-ring small pore molecular sieve promoted with copper and an 8-ring small pore molecular sieve promoted with iron according to embodiments of the invention under suitable oxidizing conditions; to a method of decomposing of $N_2O$ by contacting a stream containing $N_2O$ with a composition or catalytic article comprising an 8-ring small pore molecular sieve promoted with copper and the 8-ring small pore molecular sieve promoted with iron according to embodiments of the invention under suitable decomposition conditions; to a method of controlling emissions in Advanced Emission Systems such as Homogeneous Charge Compression Ignition (HCCI) engines by contacting an emission stream with a composition or catalytic article comprising a washcoat containing both an 8-ring small pore molecular sieve promoted with copper and the 8-ring small pore molecular sieve promoted with iron according to embodiments of the invention under suitable conditions; to a fluid catalytic cracking FCC process wherein the composition or catalytic article comprising an 8-ring small pore molecular sieve promoted with copper and the 8-ring small pore molecular sieve promoted with iron is employed as additive; to a method of converting an organic compound by contacting said compound with a composition or catalytic article comprising an 8-ring small pore molecular sieve promoted with copper and the 8-ring small pore molecular sieve promoted with iron according to embodiments of the invention under suitable conversion conditions; to a "stationary source" process wherein a composition or catalytic article containing the 8-ring small pore molecular sieve promoted with copper and the 8-ring small pore molecular sieve promoted with iron is employed according to embodiments of the invention.

In particular, the selective reduction of nitrogen oxides is achieved using an composition or article containing both an 8-ring small pore molecular sieve promoted with copper and the 8-ring small pore molecular sieve promoted with iron according to embodiments of the invention. The catalytic article is contacted with exhaust gas in the presence of ammonia or urea. While ammonia is the reducing agent of choice for stationary power plants, urea is the reducing agent of choice for mobile SCR systems. Typically, the SCR system is integrated in the exhaust gas treatment system of a vehicle and, also typically, contains the following main components: selective catalytic reduction catalytic article containing an 8-ring small pore molecular sieve promoted with copper and an 8-ring small pore molecular sieve promoted with iron according to embodiments of the invention; a urea storage tank; a urea pump; a urea dosing system; a urea injector/nozzle; and a respective control unit.

Method of Reducing $NO_x$:

Therefore, embodiments of the invention also relates to a method for selectively reducing nitrogen oxides ($NO_x$), wherein a gaseous stream containing nitrogen oxides ($NO_x$), for example, exhaust gas formed in an industrial process or operation, and in specific embodiments also containing ammonia and/or urea, is contacted with a composition or a selective catalytic reduction catalytic article containing the 8-ring small pore molecular sieve promoted with copper and the 8-ring small pore molecular sieve promoted with iron according to embodiments of the invention.

The term nitrogen oxides, $NO_x$, as used in the context of embodiments of the invention designates the oxides of nitrogen, especially dinitrogen oxide ($N_2O$), nitrogen monoxide (NO), dinitrogen trioxide ($N_2O_3$), nitrogen dioxide ($NO_2$), dinitrogen tetroxide ($N_2O_4$), dinitrogen pentoxide ($N_2O_5$), nitrogen peroxide ($NO_3$).

The nitrogen oxides which are reduced using a composition or catalytic article comprising containing the 8-ring small pore molecular sieve promoted with copper and the 8-ring small pore molecular sieve promoted with iron according to embodiments of the invention or an 8-ring small pore molecular sieve promoted with copper and the 8-ring small pore molecular sieve promoted with iron obtainable or obtained according to embodiments of the invention may be obtained by any process, e.g. as a waste gas stream. Among others, waste gas streams as obtained in processes for producing adipic acid, nitric acid, hydroxylamine derivatives, caprolactame, glyoxal, methyl-glyoxal, glyoxylic acid or in processes for burning nitrogeneous materials may be mentioned.

In specific embodiments, a composition or catalytic article containing the 8-ring small pore molecular sieve promoted with copper and the 8-ring small pore molecular sieve promoted with iron is used for removal of nitrogen oxides ($NO_x$) from exhaust gases of internal combustion engines, in particular diesel engines, which operate at combustion conditions with air in excess of that required for stoichiometric combustion, i.e., lean.

Therefore, embodiments of the invention also relate to a method for removing nitrogen oxides ($NO_x$) from exhaust gases of internal combustion engines, in particular diesel engines, which operate at combustion conditions with air in excess of that required for stoichiometric combustion, i.e., at lean conditions, wherein a composition or catalytic article containing both the 8-ring small pore molecular sieve promoted with copper and the 8-ring small pore molecular sieve promoted with iron according to embodiments of the invention or an 8-ring small pore molecular sieve promoted with copper and the 8-ring small pore molecular sieve promoted with iron is employed.

Exhaust Gas Treatment System:

Embodiments of the invention relate to an exhaust gas treatment system comprising an exhaust gas stream optionally containing a reductant such as ammonia, urea and/or hydrocarbon, and in specific embodiments, ammonia and/or urea, and a selective catalytic reduction catalytic article containing the 8-ring small pore molecular sieve promoted with copper and the 8-ring small pore molecular sieve promoted with iron, disposed on a substrate, and a second exhaust gas treatment component, for example, a soot filter and a diesel oxidation catalyst.

The soot filter, catalyzed or non-catalyzed, may be upstream or downstream of said catalytic article. The diesel oxidation catalyst in specific embodiments is located upstream of said catalytic article. In specific embodiments, said diesel oxidation catalyst and said catalyzed soot filter are upstream from said catalytic article.

In specific embodiments, the exhaust is conveyed from the diesel engine to a position downstream in the exhaust system, and in more specific embodiments, containing $NO_x$, where a reductant is added and the exhaust stream with the added reductant is conveyed to said catalytic article.

For example, a catalyzed soot filter, a diesel oxidation catalyst and a reductant are described in WO 2008/106519 which is incorporated by reference. In specific embodiments, the soot filter comprises a wall-flow filter substrate, where the channels are alternately blocked, allowing a gaseous stream entering the channels from one direction (inlet direction), to flow through the channel walls and exit from the channels from the other direction (outlet direction).

An ammonia oxidation catalyst may be provided downstream of the catalytic article to remove any slipped ammonia from the system. In specific embodiments, the AMOX catalyst may comprise a platinum group metal such as platinum, palladium, rhodium or combinations thereof. In more specific embodiment, the AMOX catalyst can include a washcoat containing both the 8-ring small pore molecular sieve promoted with copper and the 8-ring small pore molecular sieve promoted with iron.

Such AMOX catalysts are useful in exhaust gas treatment systems including an SCR catalyst. As discussed in commonly assigned U.S. Pat. No. 5,516,497, the entire content of which is incorporated herein by reference, a gaseous stream containing oxygen, nitrogen oxides and ammonia can be sequentially passed through first and second catalysts, the first catalyst favoring reduction of nitrogen oxides and the second catalyst favoring the oxidation or other decomposition of excess ammonia. As described in U.S. Pat. No. 5,516,497, the first catalysts can be a SCR catalyst comprising a zeolite and the second catalyst can be an AMOX catalyst comprising a zeolite.

AMOX and/or SCR catalyst composition can be coated on the flow through or wall-flow filter. If a wall flow substrate is utilized, the resulting system will be able to remove particulate matter along with gaseous pollutants. The wall-flow filter substrate can be made from materials commonly known in the art, such as cordierite, aluminum titanate or silicon carbide. It will be understood that the loading of the catalytic composition on a wall flow substrate will depend on substrate properties such as porosity and wall thickness, and typically will be lower than loading on a flow through substrate.

Ion Exchange of Metal:

The 8-ring small pore molecular sieve promoted with iron or promoted with copper may be promoted with other metals. Suitable metals include, but are not limited to cobalt, nickel, cerium, platinum, palladium, rhodium and combinations thereof. The metal can be exchanged after manufacture of the zeolite. According to one or more embodiments, at least a portion of the metal can be included in the tailored colloid such that the tailored colloid contains the structure directing agent, a silica source, and alumina source and a metal ion (e.g., copper) source.

For additional promotion of SCR of oxides of nitrogen, a suitable alkaline earth or alkali metal is exchanged into the copper promoted molecular sieve material. Suitable alkaline earth or alkali metals include, but are not limited to, barium, magnesium, beryllium, calcium, strontium, radium, and combinations thereof. In specific embodiments, the alkaline earth or alkali metal component is selected from barium, magnesium, calcium and combinations thereof. In very specific embodiments, barium is exchanged into the copper promoted molecular sieve. The metal can be exchanged after the manufacture of the molecular sieve.

Copper-Exchange or Iron-Exchange into to Alkali Metal or $NH_4$-Chabazite to Form Metal-Chabazite:

Copper or iron is ion exchanged into alkali metal or $NH_4$ 8 ring small pore molecular sieves. In specific embodiments, copper or iron is ion exchanged into alkali metal or $NH_4$-Chabazite to form Cu-Chabazite or Fe-Chabazite. When copper acetate is used, the copper concentration of the liquid copper solution used in the copper ion-exchange is in specific embodiments in the range from about 0.01 to about 0.4 molar, more specifically in the range from about 0.05 to about 0.3 molar, even more specifically in the range from about 0.1 to about 0.25 molar, even more specifically in the range from about 0.125 to about 0.25 molar, even more specifically in the range from about 0.15 to about 0.225 molar and even more specifically in the range from about 0.2.

According to an embodiment of the present invention, the molecular sieve material (which may be zeolitic material or non-zeolitic material) of the invention is used in a catalytic process. In general, the compositions and catalytic articles of the invention can be used in any conceivable catalytic process, wherein processes involving the conversion of at least one organic compound, more specifically of organic compounds comprising at least one carbon-carbon and/or carbon-oxygen and/or carbon-nitrogen bond, more specifically of organic compounds comprising at least one carbon-carbon and/or carbon-oxygen bond, and even more specifically of organic compounds comprising at least one carbon-carbon bond. In particularly specific embodiments of the present invention, compositions and catalytic articles can be used to catalyze any one or more of methanol-to-olefin (MTO) reactions, ethylene-to-propylene (ETP) reactions, as well as of the co-reaction of methanol and ethylene (CME). The processes involve contacting the compounds with the compositions or catalytic articles according to embodiments of the invention.

According to a further embodiment of the present invention, the composition or catalytic article of the present invention can be used in a catalytic process involving the conversion of at least one compound comprising at least one nitrogen-oxygen bond. According to one or more embodiments of the present invention the composition or the catalytic article is used in a selective catalytic reduction (SCR) process for the selective reduction of nitrogen oxides $NO_x$; for the oxidation of $NH_3$, in particular for the oxidation of $NH_3$ slip in diesel systems; for the decomposition of $N_2O$. The term nitrogen oxides, $NO_x$, as used in the context of the present invention designates the oxides of nitrogen, especially dinitrogen oxide ($N_2O$), nitrogen monoxide (NO), dinitrogen trioxide ($N_2O_3$), nitrogen dioxide ($NO_2$), dinitrogen tetroxide ($N_2O_4$), dinitrogen pentoxide ($N_2O_5$), nitrogen peroxide ($NO_3$). According to particularly specific embodiments of the present invention, the composition or catalytic article can be used in a catalytic process involving the conversion of at least one compound comprising at least one nitrogen-oxygen bond comprises Cu and Fe. The process can be accomplished by contacting the compound with a catalytic article according to an embodiment of the invention.

Therefore, embodiments of the present invention also relate to a method for selectively reducing nitrogen oxides $NO_x$ by contacting a stream containing $NO_x$ with a composition or catalytic article according to the present invention under suitable reducing conditions; to a method of oxidizing $NH_3$, in particular of oxidizing $NH_3$ slip in diesel systems, by contacting a stream containing $NH_3$ with a catalyst composition or catalytic article under suitable oxidizing conditions; to a method of decomposing of $N_2O$ by contacting a stream containing $N_2O$ with a catalyst composition or catalytic article under suitable decomposition conditions; to a method of controlling emissions in Advanced Emission Systems such as Homogeneous Charge Compression Ignition (HCCI) engines by contacting an emission stream with a composition or catalytic article under suitable conditions; to a fluid catalytic cracking FCC process wherein the composition is employed as additive; to a method of converting an organic compound by contacting said compound with the composition or catalytic article under suitable conversion conditions; to a "stationary source" process wherein composition or catalytic article is employed.

Accordingly, embodiments of the present invention also relates to a method for selectively reducing nitrogen oxides $NO_x$, wherein a gaseous stream containing nitrogen oxides $NO_x$, specifically also containing ammonia and/urea, is contacted with the composition or catalytic article according to the present invention, for example, in the form of a molded catalytic article, specifically as a molded catalytic article wherein the washcoat is deposited on a suitable refractory carrier, still more specifically on a "honeycomb" carrier.

The nitrogen oxides which are reduced using the catalytic article according to embodiments of the present invention may be obtained by any process, e.g. as a waste gas stream. Among others, waste gas streams as obtained in processes for producing adipic acid, nitric acid, hydroxylamine derivatives, caprolactame, glyoxal, methyl-glyoxal, glyoxylic acid or in processes for burning nitrogeneous materials may be mentioned.

In specific embodiments, the catalytic article according to embodiments of the present invention is used as a molded catalyst, still more specifically as a molded catalyst wherein the washcoat is deposited on a suitable refractory carrier, still more specifically on a "honeycomb" carrier, for the selective reduction of nitrogen oxides $NO_x$, i.e. for selective catalytic reduction of nitrogen oxides. In particular, the selective reduction of nitrogen oxides wherein catalytic article according to an embodiment of the present invention is employed in an exhaust gas stream in the presence ammonia or urea. While ammonia is the reducing agent of choice for stationary power plants, urea is the reducing agent of choice for mobile SCR systems. Typically, the SCR system is integrated in the engine and vehicle design and, also typically, contains the following main components: SCR catalytic article including the washcoat containing both the copper promoted molecular sieve material and the iron-promoted molecular sieve; a urea storage tank; a urea pump; a urea dosing system; a urea injector/nozzle; and a respective control unit.

More specific embodiments pertain to the use of a composition or catalytic article for removal of nitrogen oxides $NO_x$ from exhaust gases of internal combustion engines, in particular diesel engines, which operate at combustion conditions with air in excess of that required for stoichiometric combustion, i.e. in a lean operation mode.

Therefore, embodiments the present invention also relates to a method for removing nitrogen oxides $NO_x$ from exhaust gases of internal combustion engines, in particular diesel engines, which operate at combustion conditions with air in excess of that required for stoichiometric combustion, i.e., at lean conditions, wherein a composition or catalytic article described herein is employed as catalytically active material.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXAMPLES

Example 1

Preparation of Catalyst Compostions and Articles (Cu-CHA)

A Cu-CHA powder catalyst was prepared by mixing 100 g of Na-form CHA, having a silica/alumina mole ratio of 30, with 400 mL of a copper (II) acetate solution of about 1.0 M. The pH was adjusted to about 3.5 with nitric acid. An ion-exchange reaction between the Na-form CHA and the copper ions was carried out by agitating the slurry at about 80° C. for about 1 hour. The resulting mixture was then filtered to provide a filter cake, and the filter cake was washed with deionized water in three portions until the filtrate was clear and colorless, and the washed sample was dried.

The obtained Cu-CHA catalyst comprised CuO at a range of about 2 to 3.5% by weight, as determined by ICP analysis. A CuCHA slurry was prepared to 40% target solids. The slurry was milled and a binder of zirconium acetate in dilute acetic acid (containing 30% $ZrO_2$) was added into the slurry with agitation.

The slurry was coated onto 1"D×3"L cellular ceramic cores, having a cell density of 400 cpsi (cells per square inch) and a wall thickness of 6 mil. The coated cores were dried at 110° C. for 3 hours and calcined at about 450° C. for 1 hour. The coating process was repeated once to obtain a target washcoat loading of in the range of 2-3 g/in³.

Example 2

Preparation of Ba—Cu-CHA

Ba—Cu-CHA is prepared by drop-wise addition of $Ba^{2+}$ salt solution into an aqueous slurry of Cu-CHA prepared in accordance with Example 1. The Cu-CHA filter cake obtained in Example 1 was crushed and then calcined at 600° C. for 4 h. An aqueous slurry was then prepared to 45% target solids, followed by addition of 5% ZrOAc binder, based on the zeolite solids. The mixture was mixed well, and then was milled. A solution of $Ba(OAc)_2$ (30 mL, 0.00822 g per gram of zeolite for 0.5 wt % BaO loading) was added dropwise to the aqueous slurry with stirring. The pH was adjusted to 4.5 using 15% ammonium hydroxide solution. The slurry was rolled overnight (for at least 12 hours) for in-situ ion exchange of $Ba^{2+}$.

Example 3

Preparation of Fe-CHA

Iron is incorporated into the sodium CHA through Fe-ion exchange at 60° C. for 2 hours at pH 4. The mixture is then washed with deionized water, filtered, and vacuum/air dried. A slurry is prepared of Fe-CHA to 45% target solids, and 5% ZrOAc binder is added based on the zeolite solids. The slurry is mixed well and then milled to $D_{90}$% of 7-10 microns.

Example 4

Preparation of Washcoat Containing Fe-CHA+Cu-CHA and Fe-CHA+Ba—Cu-CHA

The Fe-CHA slurry is then added to the Ba—Cu-CHA slurry in a ratio of 2:1 Cu-CHA:Fe-CHA. Similarly, a second sample is made by adding Fe-CHA slurry to Cu-CHA slurry in a ratio of 2:1 Cu-CHA:Fe-CHA. The slurries are mixed well, and the pH is adjusted to 4.5 with 15% ammonium hydroxide solution. The mixture is then coated onto to substrates to a washcoat loading of 3 g/in³. The washcoat is dried under air at 130° C. for 5 min. A second coat is then applied. After the final coating, the substrate is calcined at 450° C. for 1 hour.

Example 5A and 5B

Fe-CHa and Cu-CHA Washcoat

A blended washcoat was prepared by mixing the washcoat of Examples 1 and 3 in a ratio of Cu-CHA to Fe-CHA of 2:1 to provide a homogeneous washcoat mixture. This sample was designated 5A. Sample 5B comprised a 5/1 homogeneous blend of Cu-CHA to Fe-CHA.

Reference Examples

A blended washcoat was prepared by mixing the washcoat of Example 1 and Fe-MFI (4 wt. % Fe, SAR 27) in a ratio of Cu-CHA to Fe-MFI of 2:1 to provide a homogeneous washcoat mixture.

A layered washcoat was prepared on a core sample described above in 2:1 weight ratios of Cu-CHA to Fe-CHA prepared in accordance with Examples 1 and 3 above. Two zoned samples were prepared by placing Cu-CHA in a front zone and Fe-CHA in a rear zone at a ratio of 2:1 Cu-CHA to Fe-CHA. Another zoned sample was prepared in the reverse configuration, with Fe-CHA in the front zone and at ratio of 2:1 Cu-CHA to Fe-CHA.

Example 6

Testing

Nitrogen oxides selective catalytic reduction (SCR) efficiency and selectivity of a fresh catalyst core was measured by adding a feed gas mixture of 500 ppm of NO, 500 ppm of $NH_3$, 10% $O_2$, 5% $H_2O$, balanced with $N_2$ to a steady state reactor containing a 1"D×3"L catalyst core. The reaction was carried at a space velocity of 80,000 $hr^{-1}$ across a 150° C. to 460° C. temperature range.

The samples were hydrothermally aged in the presence of 10% $H_2O$ at 750° C. for 15 hours, followed by measurement of the nitrogen oxides SCR efficiency and selectivity by the same process as outlined above for the SCR evaluation on a fresh catalyst core.

FIG. 1 shows the $NO_x$ conversion versus temperature for the samples, which shows that the uniform mixture of Cu-CHA+Fe-CHA exhibited the best performance. As noted above, all mixture/layered/zoned combinations were prepared with 2:1 ratios of Cu-CHA:Fe-CHA. However, the uniform mixture clearly outperformed all other samples at 200° C. and 600° C. for NOx conversion.

Example 7

Further Engine Testing

Steady state SCR-test of aged samples were tested on an engine bench (Diamler OM642 3 L 6 cylinder engine) with following Diesel Oxidation Catalyst (DOC) and Catalytic Soot Filter (CSF) upstream to Selective Catalytic Reduction (SCR) catalysts: DOC: 120 $g/ft^3$ platinum group metal, Pt/Pd=1/1, 5.66×3" 400/6; CSF: 39 $g/ft^3$ of Pt and Pd in a Pt/Pd ratio of 3/1, 5.66×6". The data from steady state testing is shown in the Table and FIG. 1 below. Samples were aged using oven aging: 15 h/750° C. hydrothermal. In the table below, "steady state" refers to there being no restriction on ammonia slip.

In the Table below, NOx efficiency was compared against a sample of Cu-CHA. In the table, the values show the percentage increase or decrease in NOx conversion at a given condition compared to Cu-CHA. Thus, for example, Example 5 showed 3% better NOx conversion for Run 1, 6% better NOx conversion for Run 2, 3% better NOx conversion than Run 3 and 10% better NOx conversion for Run 4 than Example 1. The two small pore zeolites in a homogeneous washcoat showed much better NOx conversions for every run compared to Cu-CHA alone or a mixture of Cu-CHA with Fe-MFI.

| SAMPLE | Run 1 $NO_x$ Eff. 230° C. @ 0.5 g/L $NH_3$ | Run 2 $NO_x$ Eff. 230° C. 10 ppm $NH_3$ slip | Run 3 $NO_x$ Eff. 230° C. Max. (steady state) | Run 4 $NO_x$ Eff. 580° C. Max. (steady state) |
|---|---|---|---|---|
| A: Cu-CHA | 0 | 0 | 0 | 0 |
| B: Cu-CHA + Fe-CHA | +3 | +6 | +3 | +10 |
| C: Ba-Cu-CHa + Fe-CHA | +3 | +7 | +4 | +10 |
| D: Cu-CHA + Fe-MFI | −6 | −10 | −14 | +1 |

Ammonia slip was measured and Ba—Cu-CHA+Fe-CHA uniform mixture sample shows the lowest $NH_3$ slip compared to other samples at 230° C. Thus, a composition containing a Fe-promoted 8-ring small pore molecular sieve and a Cu-promoted 8-ring small pore molecular sieve provide optimal performance at significantly lower $NH_3$ filling level versus Cu-SSZ13 and the other samples, which will provide excellent performance for LDD and other light duty lean burn engines.

Example 8

Additional Engine Testing

Figure 2:
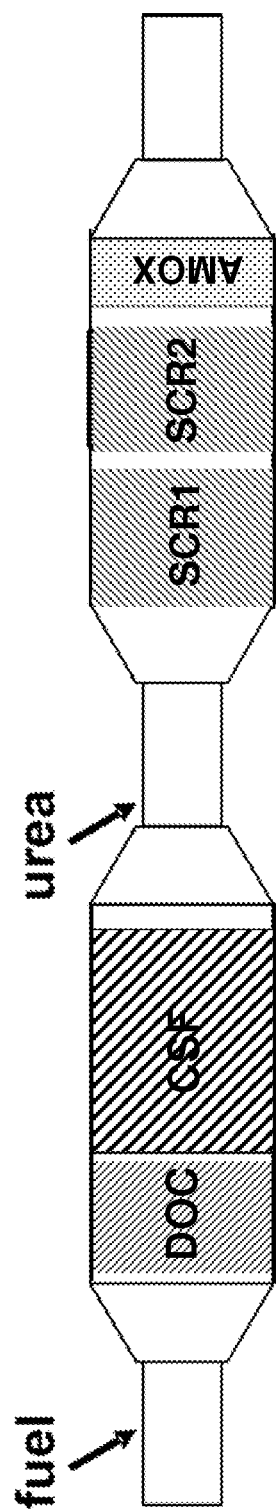
FIG. 2 is a catalyst system configuration comprising a Diesel Oxidation Catalyst (DOC), Catalytic Soot Filter (CSF), Selective Catalytic Reduction catalysts (SCRs), and Ammonia Oxidation catalyst (AMOX), used in Heavy Duty Diesel Federal Test Protocol (HDD FTP) engine test.
Figure 3:
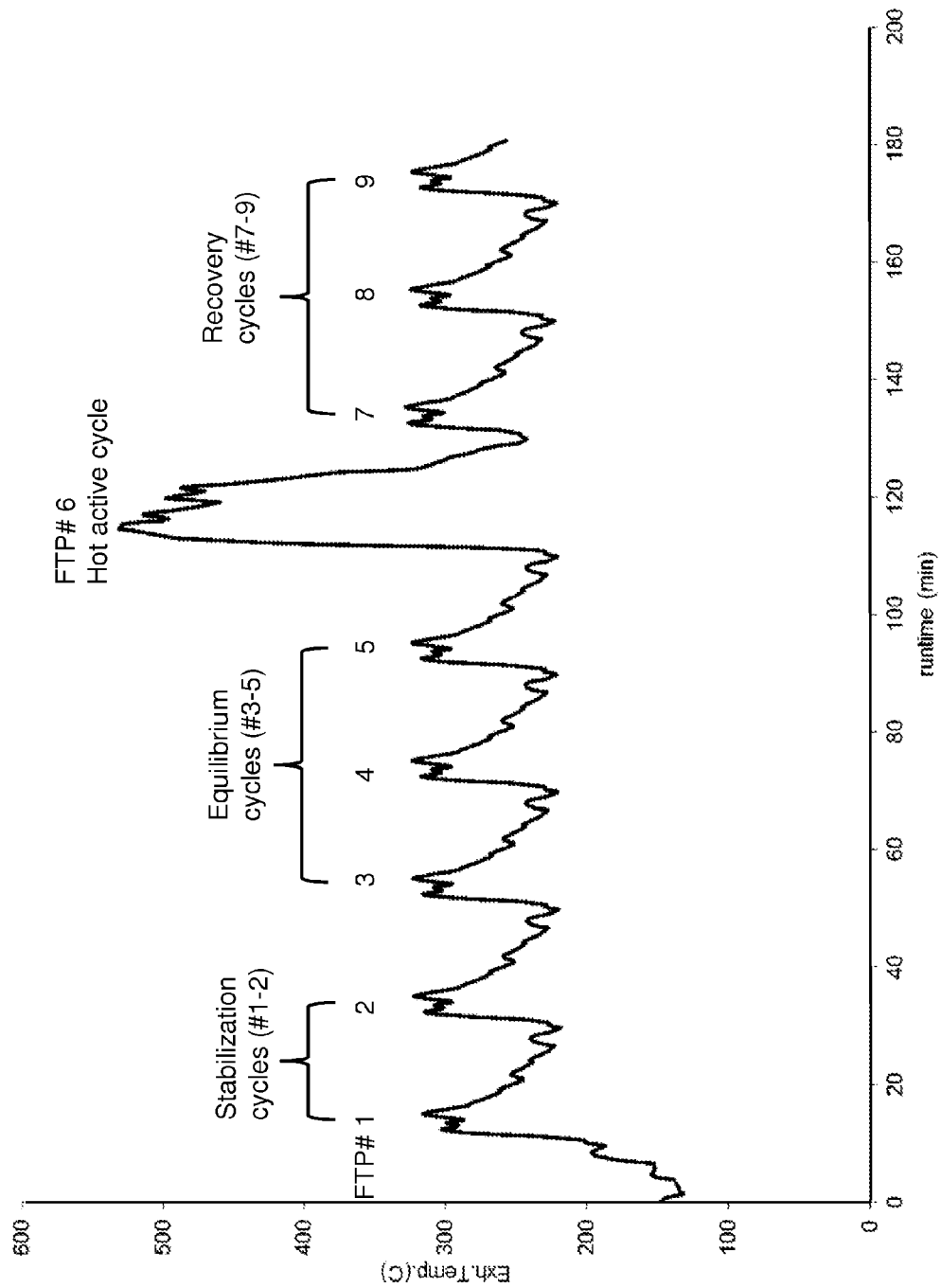
FIG. 3 is a graph showing exhaust temperature trace of HDD FTP test equilibrium with total 9 FTP cycles. FTP cycles #1-2 are stabilization cycles, #3-5 are equilibrium cycles, #6 is a hot active cycle, and #7-9 are recovery cycles.
Figure 4:
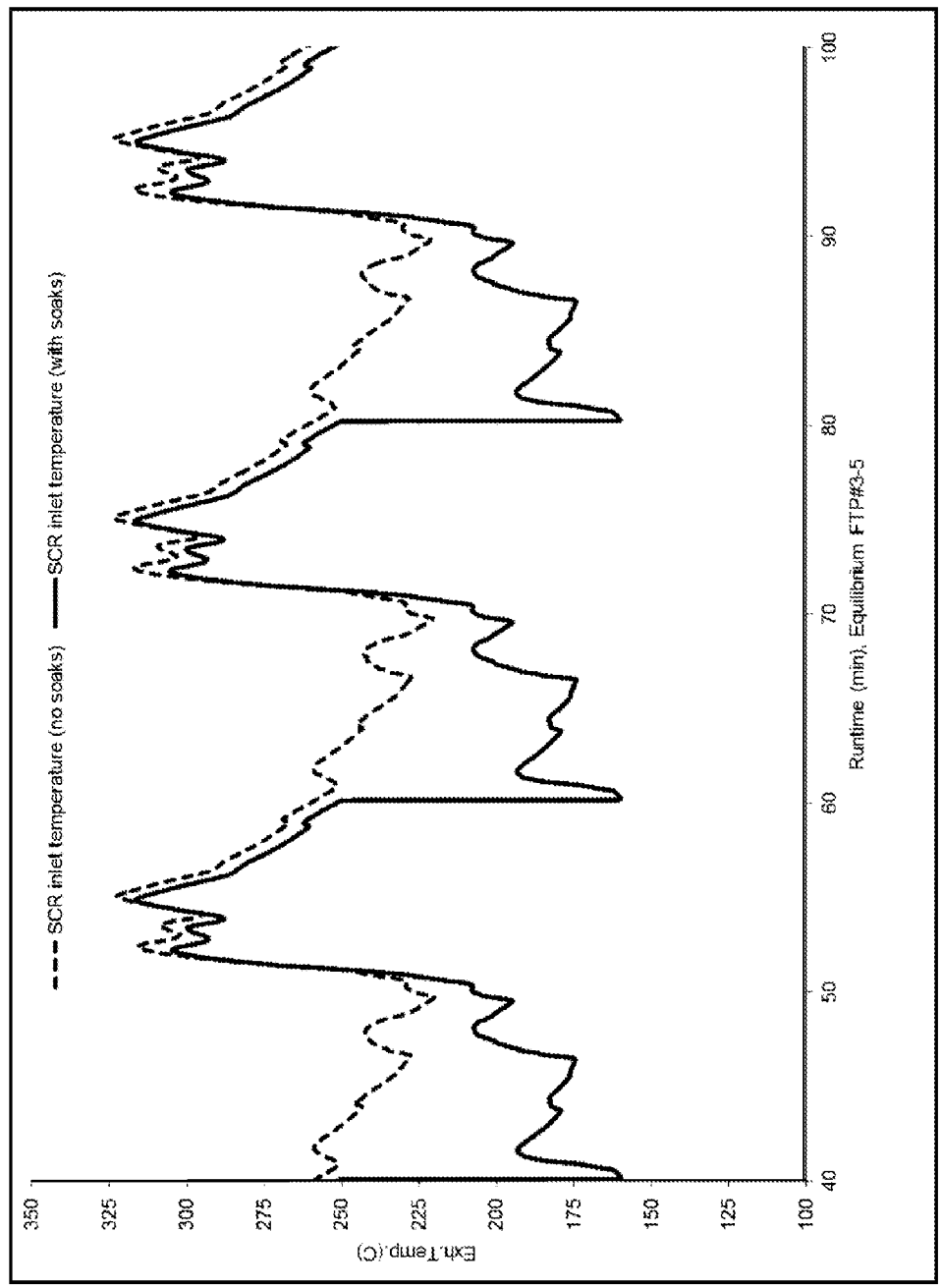
FIG. 4 is a graph showing exhaust temperature trace of HDD FTP test equilibrium cycles #3-5 with and without soaks.

Example 5A was subjected to HDD FTP testing on a Cummins 2008 300 HP ISC engine with catalyst system composed of DOC, CSF, SCRs, and AMOX catalysts. FIG. 2 shows the catalyst system configuration used in this HDD FTP engine test. Evaluations were completed over nine consecutive FTP cycles (Cycles 1 and 2 were stabilization cycles used to establish equilibrium. Cycles 3 through 5 were equilibrium cycles to assess equilibrium performance. Cycle 6 was active cycle with 550° C. peak temperature. Cycles 7 through 9 were recovery cycles to assess performance recovery after high temperature exposure, similar to SCR inlet temperature after an active filter regeneration to burn soot.) FIG. 3 shows the temperature profile inlet to SCR1 for all FTP cycles. Urea injection was done to maintain NSR=1.0, $NH_3$ to NOx ratio. Two Catalytic Soot Filters (CSFs) with different Pt/Pd ratios (10:1 and 4:1) at 5 $g/ft^3$ total PGM loading were used upstream of SCR catalysts to generate two different $NO_2$/NOx ratios (0.456 with 10:1 and 0.285 with 4:1) in the exhaust feed during testing. FIG. 4 shows the temperature profile inlet to SCR1 when test is done with soaks (a cool down step, to 160° C., is applied before each cycle) and without soaks. Prior art SCR1 and SCR2 were two different copper chabazite catalysts that did not contain a second 8-ring small pore molecular sieve promoted with iron. Degreening was done for 2 hours/650° C. with active regeneration. Aging was done by 100 hours/ 650° C. active regeneration with urea injection.

Figure 5:
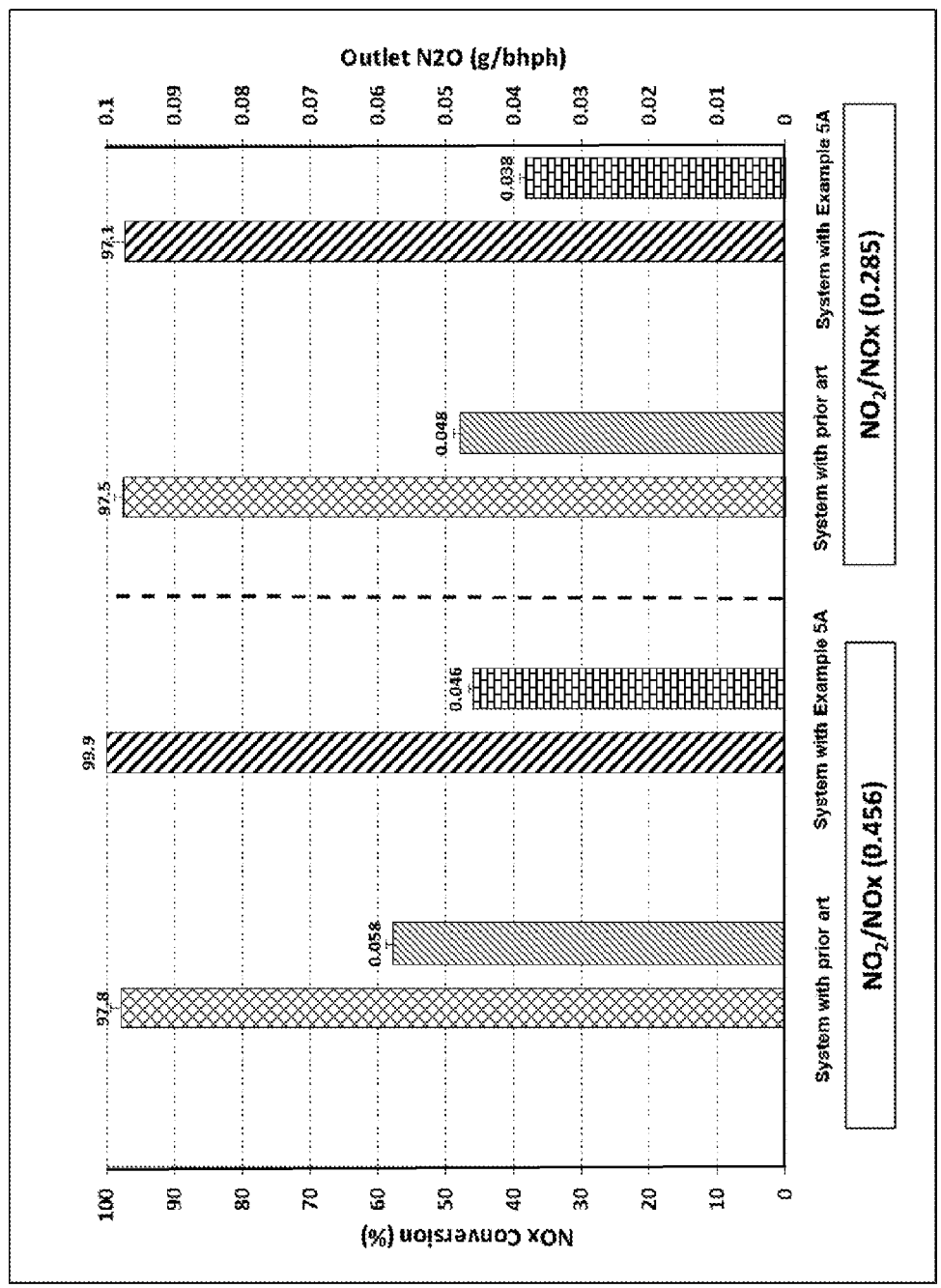
FIG. 5 is a bar chart showing engine data of equilibrium FTP cycles 3-5, NOx conversion for fresh samples of Example 5A with no soaks and fresh prior art SCR1.
Figure 6:
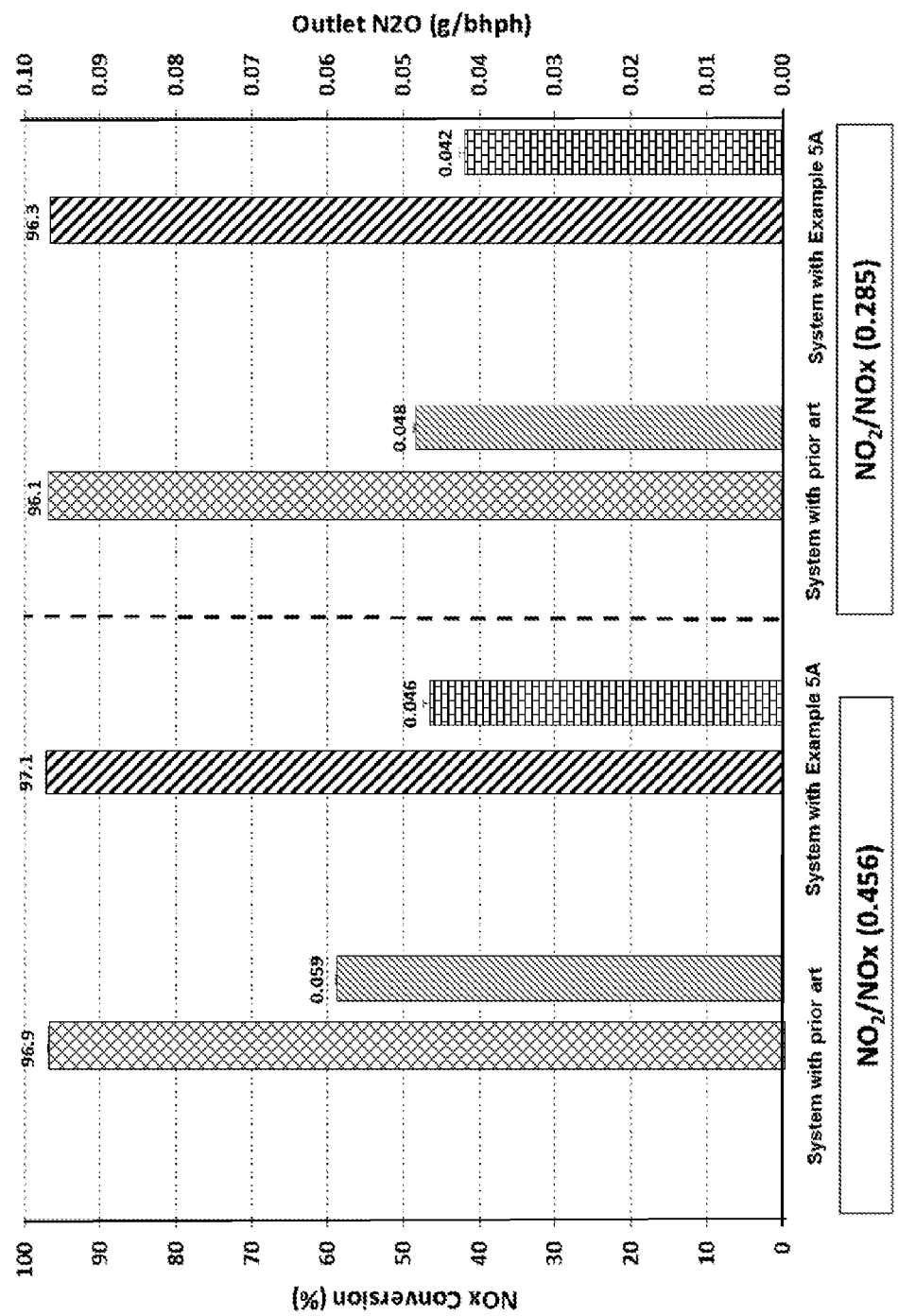
FIG. 6 is a bar chart showing engine data of equilibrium FTP cycles 3-5, NOx conversion for aged samples of Example 5A with no soaks and aged prior art SCR1.
Figure 7:
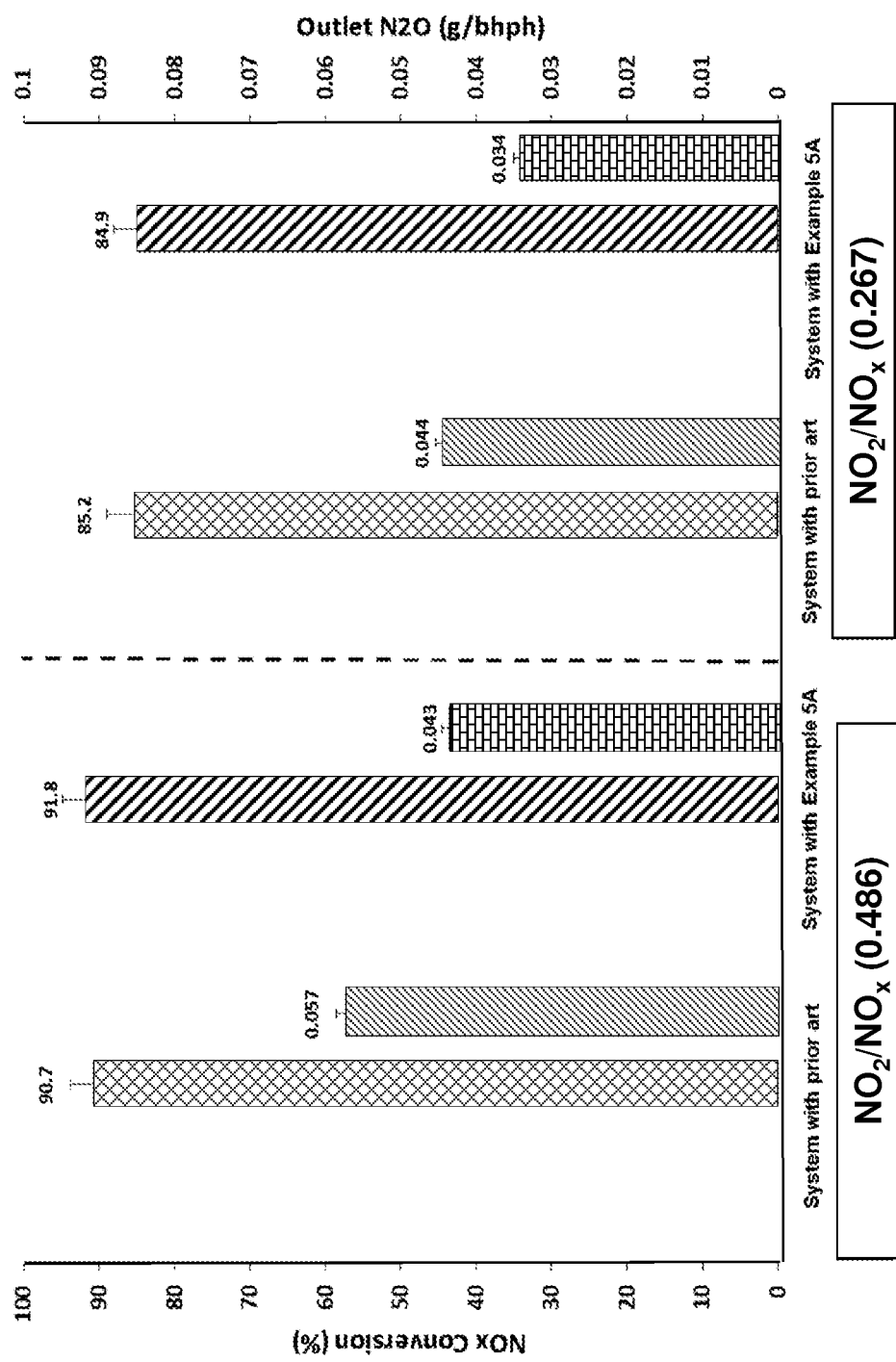
FIG. 7 is a bar chart showing engine data of equilibrium FTP cycles 3-5, NOx conversion for fresh samples of Example 5A with soaks and fresh prior art SCR1.
Figure 8:
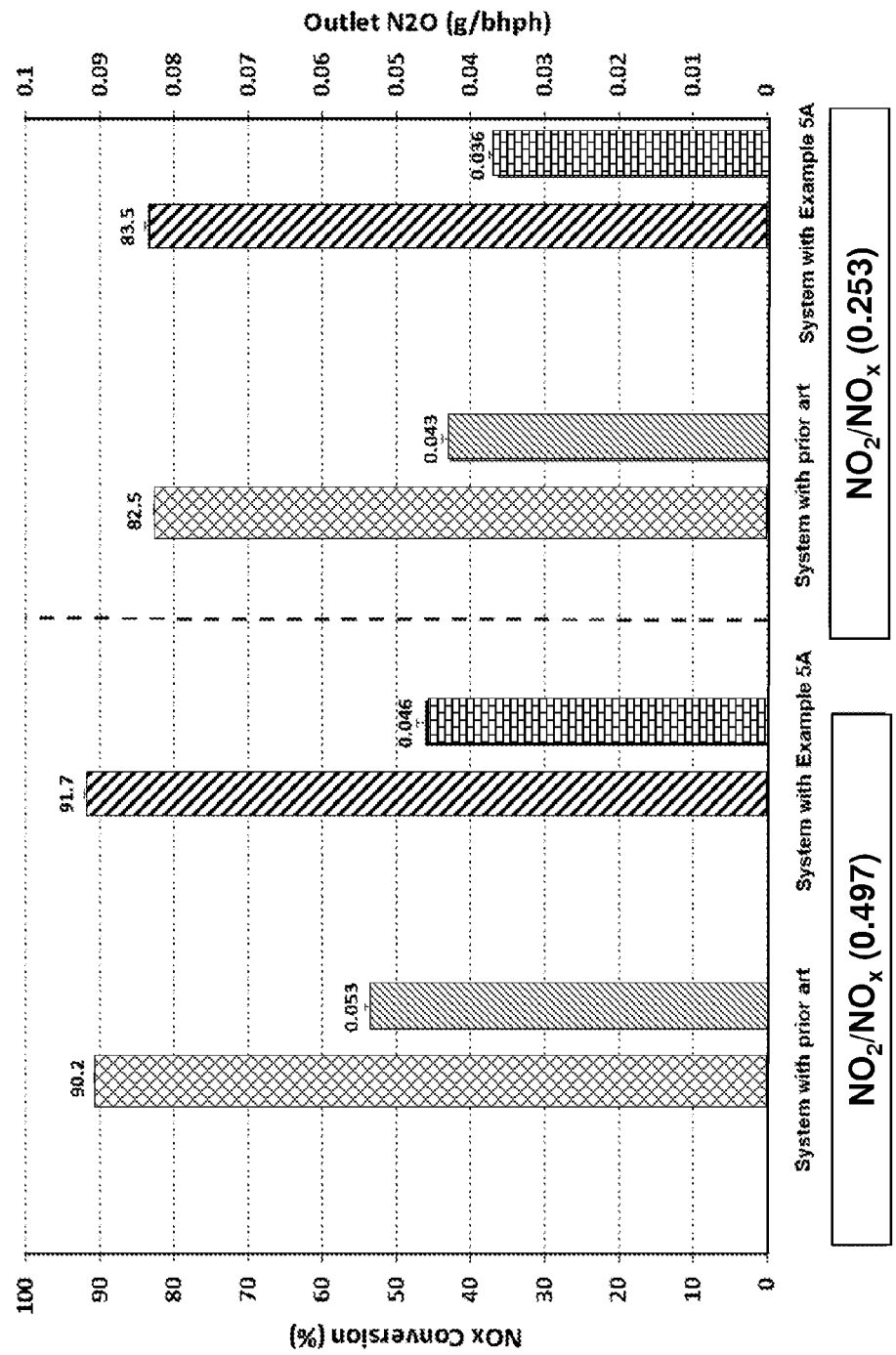
FIG. 8 is a bar chart showing engine data of equilibrium FTP cycles 3-5, NOx conversion for aged samples of Example 5A with soaks and aged prior art SCR1.
Figure 9:
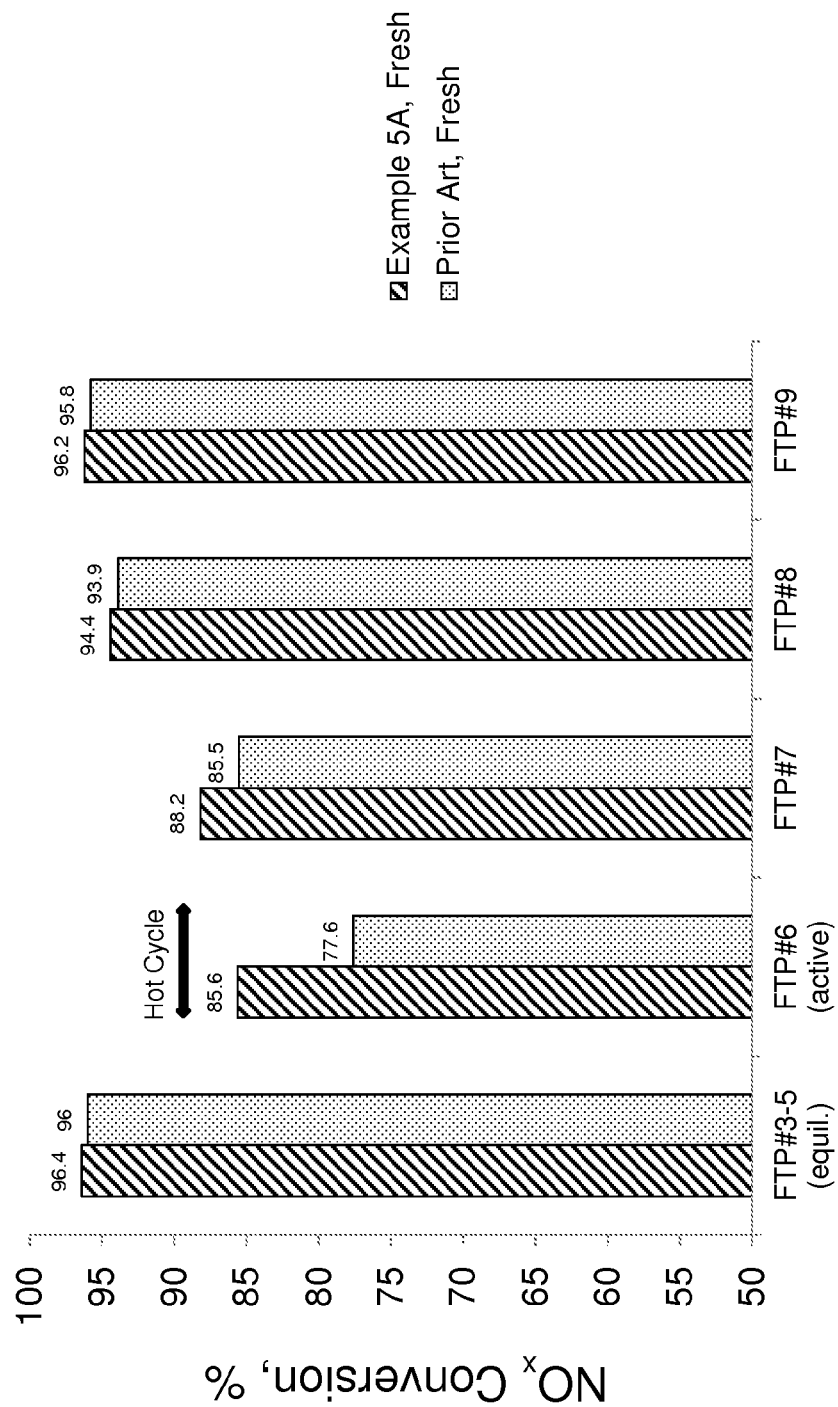
FIG. 9 is a bar chart showing engine data, NOx conversion, of FTP cycles #3-9 (equilibrium, active, and recovery cycles) with 0.5 $NO_2$/NOx with no soaks for fresh samples of Example 5A and fresh prior art SCR2.
Figure 10:
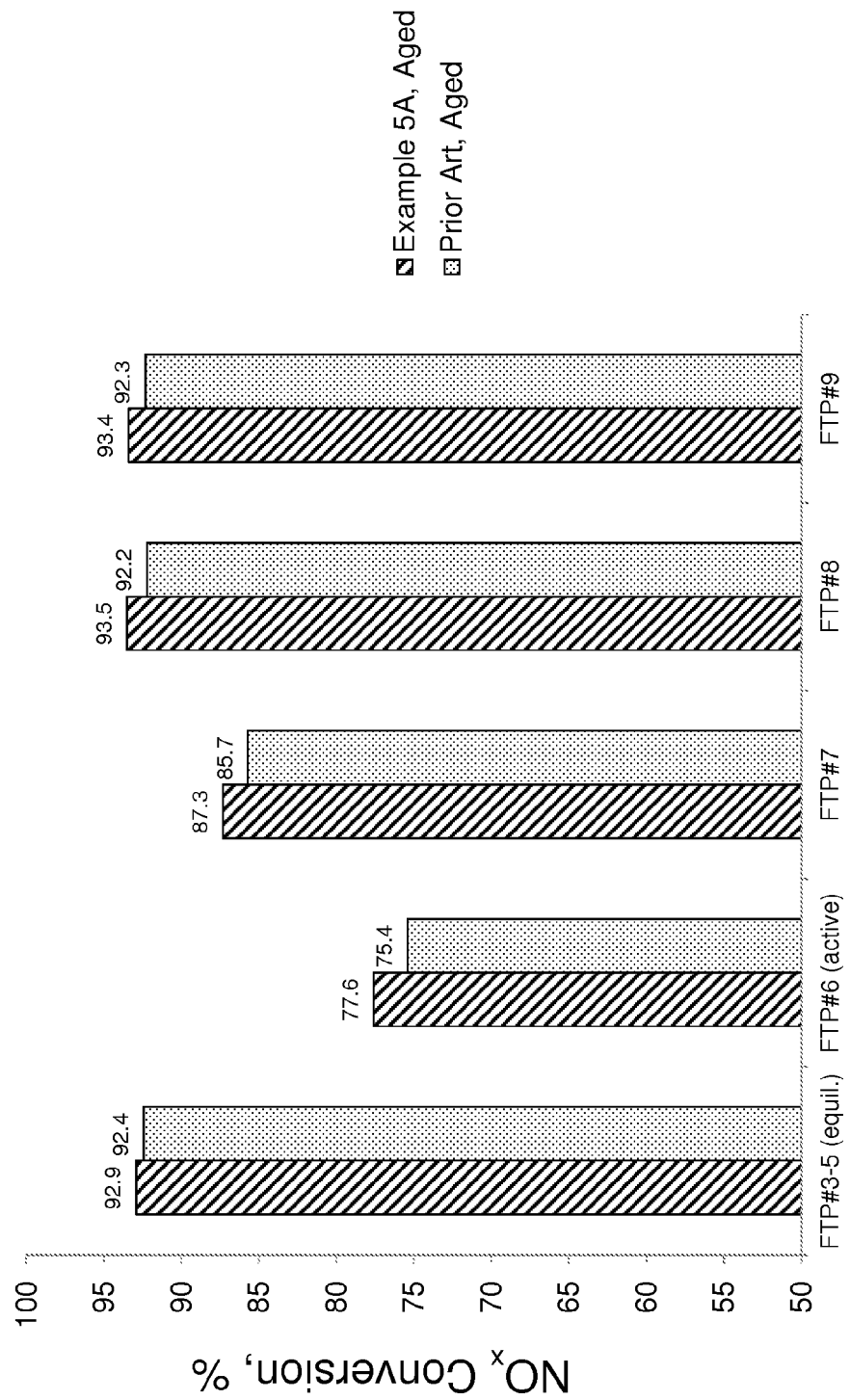
FIG. 10 is a bar chart showing engine data, NOx conversion, of FTP cycles #3-9 (equilibrium, active, and recovery cycles) with 0.5 $NO_2$/NOx with no soaks for aged samples of Example 5A and aged prior art SCR2.
Figure 11:
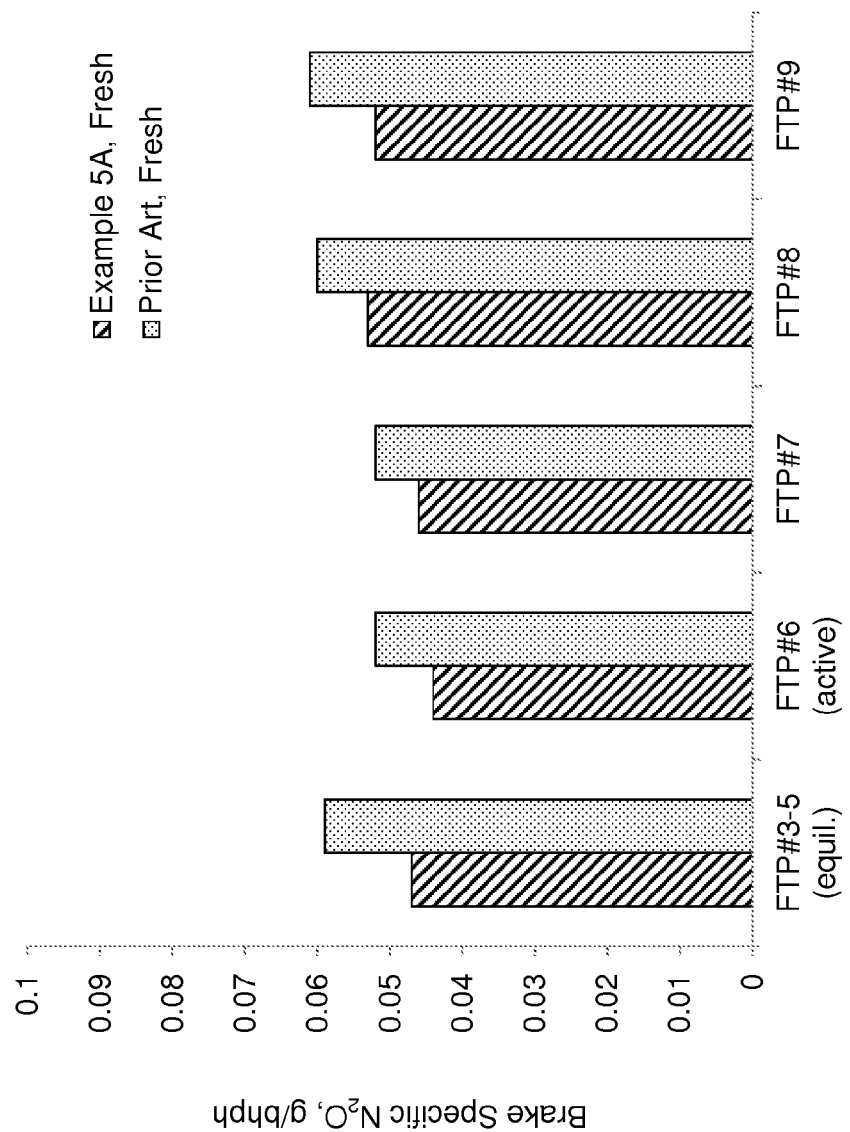
FIG. 11 is a bar chart showing engine data, brake specific $N_2O$ make, of FTP cycles #3-9 (equilibrium, active, and recovery cycles) with 0.5 $NO_2$/NOx with no soaks for fresh samples of Example 5A and fresh prior art SCR2.

FIG. 5 is a bar chart showing engine data, equilibrium FTP cycles #3-5, of NOx conversion and $N_2O$ make for fresh samples of Example 5A with no soaks and fresh prior art SCR1. For each sample in FIGS. 5 through 8, the left bar is the $NO_x$ conversion and the right bar is the outlet $N_2O$. FIG. 6 is a bar chart showing engine data, equilibrium FTP cycles #3-5, of NOx conversion and $N_2O$ make for aged samples of Example 5A with no soaks and aged fresh prior art SCR1. FIG. 7 is a bar chart showing engine data, equilibrium FTP cycles #3-5, of NOx conversion and N₂O make for fresh samples of Example 5A with soaks and fresh prior art SCR1. FIG. 8 is a bar chart showing engine data, equilibrium FTP cycles #3-5, of NOx conversion and N₂O make for aged samples of Example 5A with soaks and aged prior art SCR1. FIG. 9 is a bar chart showing engine data, NOx conversion, of FTP cycles #3-9 of fresh samples of Example 5A with no soaks and NO₂/NOx of 0.5 and fresh prior art SCR2. FIG. 10 is a bar chart showing engine data, NOx conversion, of FTP cycles #3-9 of aged samples of Example 5A with no soaks and NO₂/NOx of 0.5 and aged prior art SCR2. FIG. 11 is a bar chart showing engine data, brake specific N₂O make, of FTP cycles #3-9 of fresh samples of Example 5A with no soaks and NO₂/NOx of 0.5 and fresh prior art SCR2. FIG. 12 is a bar chart showing engine data, brake specific N₂O make, of FTP cycles #3-9 of aged samples of Example 5A with no soaks and NO₂/NOx of 0.5 and aged prior art SCR2. All $NO_x$ conversion values are expressed in percentage (%) and N₂O make is expressed in gram per brake horsepower hour (g/bhph).

Based on the HDD FTP engine test data, the SCR performance, NOx conversion, of fresh prior art and Example 5A are comparable for equilibrium FTP cycles 3 through 5 with and without soaks (FIGS. 5 and 7). Similarly, NOx conversion, of aged prior art and Example 5A are comparable for equilibrium FTP cycles 3 through 5 with and without soaks (FIGS. 6 and 8). In general, no soaks condition results in higher performance versus with soaks testing. Also, higher NO₂ concentration in the gas feed generates more N₂O (FIGS. 5 through 8). However, Example 5A catalyst produces significantly lower N₂O both at high and low NO₂/NOx levels vs. prior art catalyst (FIGS. 5 through 8, 11, and 12). In hot active cycle 6, performance improvement of Example 5A is apparent, degreened+9% and aged+3%, versus prior art SCR2 (FIGS. 9 and 10). In recovery cycles 7-9, Example 5A degreened and aged samples consistently show improved performance versus prior art SCR2 (FIGS. 9 and 10). In all cycles and as Fresh and Aged, Example 5A has lower N₂O make versus prior art SCR1 and SCR2 (FIGS. 5 through 8, 11, and 12). Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A selective catalytic reduction article comprising both a first 8-ring small pore aluminosilicate zeolite ion-exchanged with copper and a second 8-ring small pore aluminosilicate zeolite ion-exchanged with iron, the catalyst effective to catalyze the reduction of nitrogen oxides in the presence of a reductant.

2. The article of claim 1, wherein the first and second 8-ring small pore aluminosilicate zeolites are selected from the group consisting of zeolites having a structure type selected from AEI, AFT, AFX, CHA, EAB, ERI, KFI, LEV, SAS, SAT, and SAV.

3. The article of claim 2, wherein the first and second 8-ring small pore aluminosilicate zeolites have the CHA crystal structure.

4. The article of claim 3, wherein the 8-ring small pore aluminosilicate zeolite is selected from the group consisting of SSZ-13, SSZ-62, natural chabazite, zeolite K-G, Linde D, Linde R, LZ-218, LZ-235, LZ-236, ZK-14, and ZYT-6.

5. The article of claim 3, wherein the aluminosilicate zeolite has a silica to alumina ratio in the range of 20 and 50.

6. The article of claim 1, wherein the first 8-ring small pore aluminosilicate zeolite ion-exchanged with copper further comprises a barium component.

7. The article of claim 1, wherein the catalytic article comprises a washcoat comprising the first 8-ring small pore aluminosilicate zeolite ion-exchanged with copper and the second 8-ring small pore aluminosilicate zeolite ion-exchanged with iron disposed on a substrate.

8. The article of claim 7, wherein the second 8-ring small pore aluminosilicate zeolite ion-exchanged with iron is on a front zone and the first 8-ring small pore aluminosilicate zeolite ion-exchanged with copper is on a rear zone.

9. The article of claim 7, wherein the first 8-ring small pore aluminosilicate zeolite ion-exchanged with copper is on a front zone and the second 8-ring small pore aluminosilicate zeolite ion-exchanged with iron is on a rear zone.

10. The article of claim 7, wherein the second 8-ring small pore aluminosilicate zeolite ion-exchanged with iron is coated on the substrate as a bottom coat and the first 8-ring small pore aluminosilicate zeolite ion-exchanged with copper is coated on top of the second 8-ring small pore aluminosilicate zeolite ion-exchanged with iron.

11. The article of claim 7, wherein the first 8-ring small pore aluminosilicate zeolite ion-exchanged with copper is coated on the substrate as a bottom coat and the second 8-ring small pore aluminosilicate zeolite ion-exchanged with iron is coated on top of the first 8-ring small pore aluminosilicate zeolite ion-exchanged with copper.

12. The article of claim 1, wherein first 8-ring small pore aluminosilicate zeolite ion-exchanged with copper and the second 8-ring small pore aluminosilicate zeolite ion-exchanged with iron are present in a ratio in the range of 1:1 to 10:1 by weight of the first 8-ring small pore aluminosilicate zeolite material to the second 8-ring small pore aluminosilicate zeolite.

13. The article of claim 1, wherein the first 8-ring small pore aluminosilicate zeolite and second 8-ring small pore aluminosilicate zeolite each are selected from SSZ-13 and SSZ-62 and are present in a ratio in the range of 1:1 to 10:1 by weight of the copper-exchanged 8-ring small pore aluminosilicate zeolite to the iron-exchanged 8-ring small pore aluminosilicate zeolite.

14. The article of claim 13, wherein the first 8-ring small pore aluminosilicate zeolite further comprises a barium component.

15. The article of claim 1, wherein the catalyst is effective to catalyze the selective catalytic reduction of nitrogen oxides in the presence of a reductant at temperatures between 200° C. and 600° C.

16. A method for selectively reducing nitrogen oxides ($NO_x$), the method comprising contacting an exhaust gas stream containing $NO_x$ with the selective catalytic reduction catalytic article of claim 1.

* * * * *

UNITED STATES PATENT AND TRADEMARK OFFICE
CERTIFICATE OF CORRECTION

PATENT NO. : 9,486,792 B2  
APPLICATION NO. : 14/563172  
DATED : November 8, 2016  
INVENTOR(S) : Mohanan et al.

Page 1 of 1

It is certified that error appears in the above-identified patent and that said Letters Patent is hereby corrected as shown below:

On the Title Page

The 2$^{nd}$ Assignee was omitted. Please add as follows:

Assignees: BASF Corporation, Florham Park, NJ (US);
          N.E. Chemcat Corporation, Tokyo (JP);
          Heesung Catalysts Corporation, Kyunggi-Do, (KR)

Signed and Sealed this
Twenty-eighth Day of March, 2017

Michelle K. Lee
*Director of the United States Patent and Trademark Office*